US008842688B2

(12) United States Patent
Vahdat et al.

(10) Patent No.: US 8,842,688 B2
(45) Date of Patent: Sep. 23, 2014

(54) REDUCING CABLING COMPLEXITY IN LARGE-SCALE NETWORKS

(75) Inventors: Amin Vahdat, Poway, CA (US); Nathan Farrington, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 184 days.

(21) Appl. No.: 13/143,994

(22) PCT Filed: Jan. 20, 2010

(86) PCT No.: PCT/US2010/021515
§ 371 (c)(1),
(2), (4) Date: Aug. 19, 2011

(87) PCT Pub. No.: WO2010/090838
PCT Pub. Date: Aug. 12, 2010

(65) Prior Publication Data
US 2011/0302346 A1 Dec. 8, 2011

Related U.S. Application Data

(60) Provisional application No. 61/145,943, filed on Jan. 20, 2009.

(51) Int. Cl.
*H04L 12/26* (2006.01)
*H04L 12/931* (2013.01)
(52) U.S. Cl.
CPC ...................................... *H04L 49/40* (2013.01)
USPC ............................ 370/419; 370/256; 370/389
(58) Field of Classification Search
USPC .......................................................... 370/419
See application file for complete search history.

(56) References Cited

U.S. PATENT DOCUMENTS

| 6,842,443 | B2 * | 1/2005 | Allen et al. | 370/335 |
|---|---|---|---|---|
| 7,003,690 | B2 * | 2/2006 | Liva et al. | 714/4.2 |
| 7,177,943 | B1 * | 2/2007 | Temoshenko et al. | 709/237 |
| 7,345,991 | B1 * | 3/2008 | Shabtay et al. | 370/221 |
| 7,394,823 | B2 * | 7/2008 | Sano | 370/419 |
| 7,577,753 | B2 * | 8/2009 | Temoshenko et al. | 709/237 |
| 7,620,048 | B2 * | 11/2009 | Bass et al. | 370/392 |
| 7,701,957 | B1 * | 4/2010 | Bicknell | 370/419 |
| 7,907,630 | B1 * | 3/2011 | Bicknell | 370/467 |
| 7,971,247 | B2 * | 6/2011 | Kataria et al. | 726/22 |
| 7,983,278 | B1 * | 7/2011 | Lim et al. | 370/401 |
| 8,218,537 | B1 * | 7/2012 | Gui et al. | 370/369 |
| 8,295,303 | B2 * | 10/2012 | Demaria et al. | 370/466 |
| 8,442,401 | B2 * | 5/2013 | Dahlfort | 398/72 |
| 2004/0146062 | A1 * | 7/2004 | Parikh et al. | 370/419 |
| 2005/0232270 | A1 * | 10/2005 | Bass et al. | 370/389 |
| 2007/0140286 | A1 | 6/2007 | Kraus | |

(Continued)

*Primary Examiner* — Ian N Moore
*Assistant Examiner* — Lakeram Jangbahadur
(74) *Attorney, Agent, or Firm* — Mintz Levin Cohn Ferris Glovsky and Popeo, P.C.

(57) ABSTRACT

High speed switching networks can be created with a minimum of cabling complexity using pod switches that are connected to a core switch array. Each pod switch can include line cards arranged in parallel connecting on one side of a midplane circuit board that is orthogonal to the line cards and uplink cards also arranged in parallel connecting on an opposite side of the midplane circuit board. The uplink cards are orthogonal to both the midplane circuit board and to the line cards. Each line card provides links to computing nodes. The uplink cards connect to the core switch array. A simplified novel Ethernet extension protocol can be used in conjunction with the described hardware. Systems, methods, techniques, and articles of manufacture are also described.

18 Claims, 13 Drawing Sheets

(56) References Cited

U.S. PATENT DOCUMENTS

| | | | |
|---|---|---|---|
| 2007/0189168 A1* | 8/2007 | Yao | 370/231 |
| 2007/0263651 A1* | 11/2007 | Novotny et al. | 370/422 |
| 2008/0037441 A1 | 2/2008 | Kataria et al. | |
| 2008/0112152 A1* | 5/2008 | Figueroa et al. | 361/826 |
| 2011/0075675 A1* | 3/2011 | Koodli et al. | 370/401 |
| 2011/0273987 A1* | 11/2011 | Schlansker et al. | 370/235 |
| 2011/0302346 A1* | 12/2011 | Vahdat et al. | 710/301 |

* cited by examiner

REDUCING CABLING COMPLEXITY IN LARGE-SCALE NETWORKS

U.S. GOVERNMENT SUPPORTED RESEARCH

This invention was made with government support under Grant No. 0812072 awarded by the National Science Foundation, and by a U.S. Department of Defense SMART scholarship. The government has certain rights in the invention.

CROSS-REFERENCE TO RELATED APPLICATIONS

This application claims the benefit of U.S. provisional patent application Ser. No. 61/145,943, filed on Jan. 20, 2009 and entitled "Method and Apparatus for Reducing Cabling Complexity in Large-Scale Networks" which is incorporated by reference herein in its entirety.

TECHNICAL FIELD

The subject matter described herein relates to large scale switching networks, such as for example, data center networks, and to reduction of cabling complexity in such networks.

BACKGROUND

With the help of parallel computing frameworks, organizations routinely process petabytes of data on computational clusters containing thousands of nodes. For these massively parallel workloads, the principal bottleneck is often not the performance of individual nodes, but rather the rate at which nodes can exchange data over the network. Data center network (DCN) applications typically demonstrate little communication locality, meaning that the communication substrate must support high aggregate bisection bandwidth for worst-case communication patterns. Unfortunately, modern DCN architectures can be difficult to scale beyond a certain amount of bisection bandwidth and can become prohibitively expensive well in advance of reaching their maximum capacity.

Expensive packet switches can be replaced with many smaller, commodity switches, organized into a fat-tree topology. However, as the number of packet switches grows, so does the cabling complexity and the difficulty of actually constructing the network, especially on a tight schedule and with a minimum amount of human error. Fat-trees have been used successfully in telecom networks, HPC networks, and on chips. One major impediment to adoption of this architecture in data center Ethernet networks is the cabling complexity that can result from thousands of interconnected individual switches and the overhead of managing a large number of individual switch elements. As such, the construction of fat-tree networks from discrete packet switches is not scalable. Other solutions are needed.

SUMMARY

In addition to the inconveniences and other associated problems associated with so many cables, networks of discrete packet switches can be unnecessarily wasteful in the data center. The relative close proximity of the computer nodes and the single administrative domain can provide opportunities for eliminating redundant components, such as packaging, power conditioning circuitry, and cooling. Multiple CPUs and memory banks can be consolidated to save cost and power. Consolidation can also reduce the cost of inter-switch links, which often use expensive and power hungry optical transceivers. A multi-stage switch architecture according to implementations of the current subject matter can leverage merchant silicon to reduce the cost, power consumption, and cabling complexity of DCNs while also increasing the bisection bandwidth available to parallel applications such as MapReduce (available from Google, Inc. of Mountain View, Calif.). A fat-tree of discrete packet switches can be repackaged as a single distributed multi-stage switch, while also eliminating redundant components to save cost and power. In one aspect, an apparatus includes a midplane circuit board, a substantially planar uplink card, and a substantially planar line card. The midplane circuit board includes one or more uplink card connectors disposed on a first side and one or more line card connectors disposed on a second side that is opposite the first side. The uplink card includes a first uplink card connector disposed at least adjacently to a first uplink card edge and a second uplink card connector disposed at least adjacently to a second uplink card edge that is disposed oppositely to the first uplink card edge. The uplink card connects to the midplane circuit board such that the first uplink card connector interfaces with at least one of the uplink card connectors and is disposed orthogonally to the midplane circuit board. The line card includes a first line card connector disposed at least adjacently to a first line card edge and a second line card connector disposed at least adjacently to a second line card edge that is disposed oppositely to the first line card edge. The line card connects to the midplane circuit board such that the first line connector interfaces with at least one of the line card connectors and is disposed orthogonally to both of the midplane circuit board and the uplink card.

In another interrelated aspect, a method is provided for creating a switching network that includes one or more pod switches that each include one or more uplink cards connected to one or more line cards through a midplane circuit board such that the one or more uplink cards are disposed substantially in parallel to one another and orthogonal to the midplane circuit board and to the one or more uplink cards. The method includes connecting each of a plurality of data connections from each of a plurality of uplink circuits on each uplink card of the pod switch to a different one of a plurality of core switch circuits at a core switch array card of a core switch array. The method also includes connecting each line card to a plurality of computing nodes such that the line card provides links between each computing node and each of the one or more uplink cards via the midplane circuit board.

In yet another interrelated aspect, a high speed switching network system includes a plurality of pod switches that each include a midplane circuit board, a substantially planar uplink card, and a substantially planar line card. The midplane circuit board includes one or more uplink card connectors disposed on a first side and one or more line card connectors disposed on a second side that is opposite the first side. The uplink card includes a first uplink card connector disposed at least adjacently to a first uplink card edge and a second uplink card connector disposed at least adjacently to a second uplink card edge that is disposed oppositely to the first uplink card edge. The uplink card connects to the midplane circuit board such that the first uplink card connector interfaces with at least one of the uplink card connectors and is disposed orthogonally to the midplane circuit board. The line card includes a first line card connector disposed at least adjacently to a first line card edge and a second line card connector disposed at least adjacently to a second line card edge that is disposed oppositely to the first line card edge. The line card connects to the midplane circuit board such that the first line connector interfaces with at least one of the line card connectors and is disposed orthogonally to both of the midplane circuit board and the uplink card. The system also includes a core switch array that includes one or more core switch array cards that each includes a core switch central processing unit, a plurality of core switch circuits, and connectors for connecting to the uplink cards of the plurality of pod switches.

In optional variations, one or more of the following features can be included. The apparatus can include a central processing unit and at least one memory storing instructions that, when executed by the central processing unit, cause the central processing unit to perform operations. The operations can include breaking up an Ethernet frame received at the central processing unit from a switch port on the line card or uplink card in a sequence of 64 byte segments, encapsulating each 64 byte segment in the sequence into a separate Ethernet extension protocol frame, assigning a same virtual link identification to all Ethernet extension protocol frames originating from the switch port, and passing the Ethernet extension protocol frames from the central processing unit to a destination switch port.

The apparatus can also optionally include one or more substantially planar additional line cards that each include an additional first line card connector disposed at least adjacently to an additional first line card edge and an additional second line card connector disposed at least adjacently to an additional second line card edge that is disposed oppositely to the additional first line card edge. Each of the additional line cards connects to the midplane circuit board such that the additional first line card connector interfaces with a corresponding line card connector. The additional line cards can be disposed parallel to the line card and orthogonally to both of the midplane circuit board and the uplink card.

The apparatus can also optionally include one or more substantially planar additional uplink cards that each include an additional uplink line card connector disposed at least adjacently to an additional first uplink card edge and an additional second uplink card connector disposed at least adjacently to an additional second uplink card edge that is disposed oppositely to the additional first uplink card edge. Each of the additional uplink cards connects to the midplane circuit board such that the additional first uplink connector interfaces with a corresponding uplink connector. The additional uplink cards can be disposed parallel to the uplink card and orthogonally to both of the midplane circuit board and the line card. The circuits of a high speed switching network can optionally include application-specific integrated circuits.

The uplink card can optionally include a plurality of uplink switches configured to connect one or more core switches at a core switching array with the line card. The line card can optionally include a plurality of line switches configured to connect a plurality of computing nodes with the uplink card. The uplink card and the one or more additional uplink cards can optionally each include a plurality of uplink switches configured to connect one or more core switches at a core switching array with the line card and with a plurality of computing nodes connected to the line card. The line card can include a plurality of line switches configured to connect a plurality of computing nodes connected to the line card with the uplink card and the one or more additional uplink cards and with one or more core switches at a core switching array that are connected to a plurality of uplink switches on each of the uplink card and the one or more additional uplink cards.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
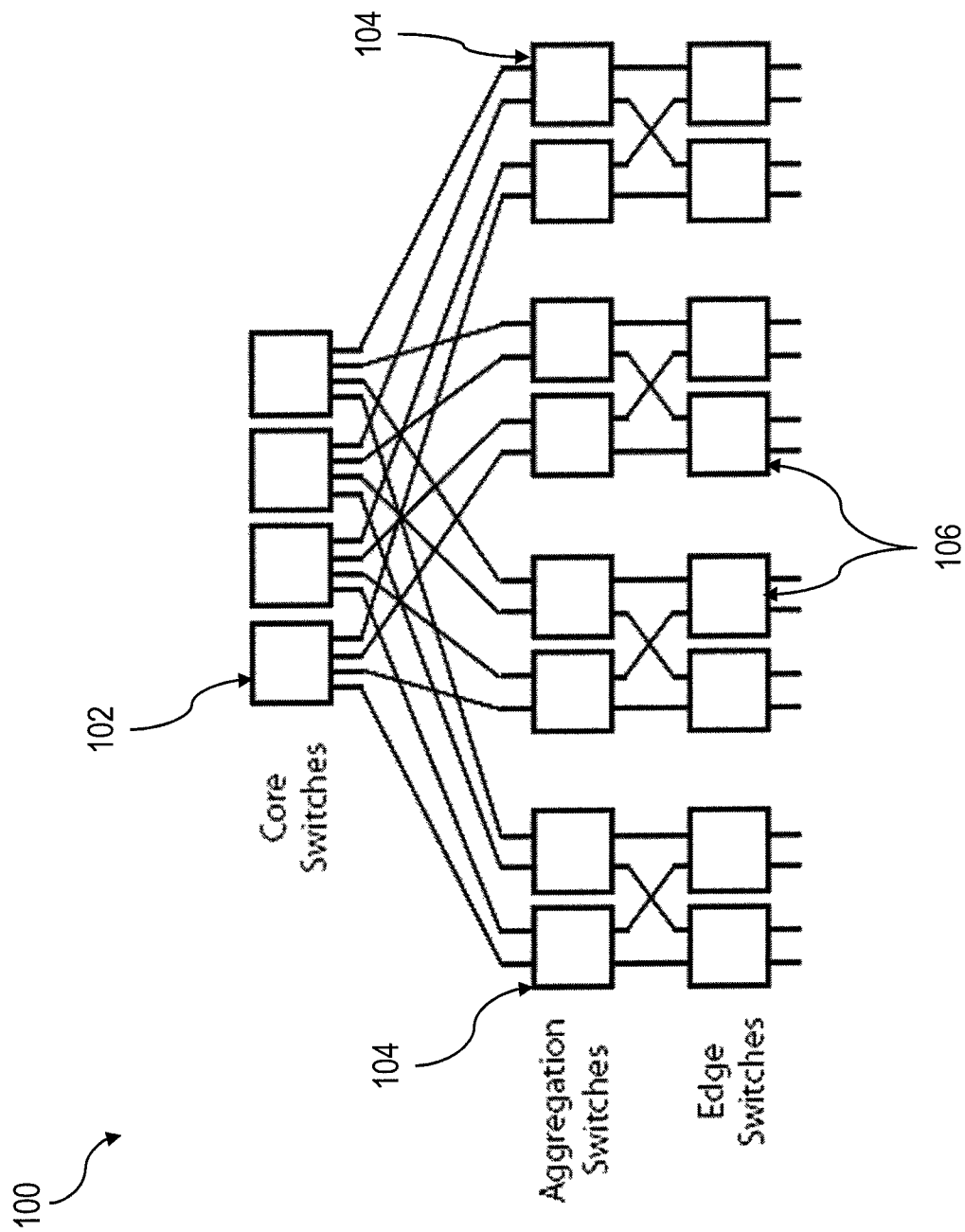
FIG. 1 is a schematic diagram showing an example of a 3-tier (5-stage) fat-tree using 4-port switching elements.

The current subject matter provides, among other possible advantages, an improved switching configuration that can condense the number of cabling connections required in a data center network by an order of magnitude or more. In one implementation, a 3,456-port 10 Gigabit Ethernet (10 GbE) switch with 34.56 terabits per second (Tb/s) of bisection bandwidth can be provided. Using commodity 10 GbE merchant silicon as the fundamental building block, cost, power, and cabling complexity can be reduced by implementing a novel Layer 2 Ethernet extension protocol (EEP) in hardware to aggregate multiple 10 GbE links into, for example, a single 40 Gigabit Ethernet (40 GbE) link, and vice versa. In this and other implementations, an improved EEP protocol can be used to reduce the number of inter-switch cables, in one example from 6,912 to just 96. With 64-port 10 GbE switch silicon, which is soon to become commercially available, the current subject matter is extendable to as many as 65,536 ports of 10 GbE, although the description herein provides examples using Gigabit Ethernet, the current subject matter may be used with other high-speed switches as well.

When constructing a DCN for a computational cluster, one objective can be to provide enough bisection bandwidth so that communication-intensive parallel computations can maintain high-levels of CPU utilization. A bisection of a network can be a partition into two or more equally-sized sets of nodes. The sum of the capacities of links between the two or more partitions is called the bandwidth of the bisection. The bisection bandwidth of a network is the minimum such bandwidth along all possible bisections. Therefore, bisection bandwidth can be thought of as a measure of worst-case network capacity. Cabling complexity can be defined as a measure of the number of long inter-switch cables required to construct a particular DCN. Short intra-rack cables or cables that cross between adjacent racks are not difficult to install and maintain, but long cables require planning and overhead cable trays. They are also more difficult to test and to replace after a break. This in turn increases the cost of the network.

A fat-tree topology, such as is used in various implementations of the current subject matter, can provide an enormous amount of bisection bandwidth while using only small, uniform switching elements. FIG. 1 shows a small example of a fat-tree topology 100 constructed from 4-port switching elements. The fat-tree topology 100 includes three layers that respectively include 4-port core switches 102, 4-port aggregation switches 104, and 4-port edge switches 106. Bandwidth scaling can be achieved with multiple, redundant paths through the network. However, using conventional techniques, the large number of links required to create such a network can translate into a large degree of cabling complexity, making the network difficult or impractical to construct and maintain.

DCNs are generally composed of racks, switches, cables, and transceivers. A typical metal rack measures approximately 0.6 m wide by approximately 1 m deep by approximately 2 m high, has an unloaded weight of approximately 170 kg, and can support a maximum load of approximately 900 kg. A 2 m high rack can be partitioned into 42 vertical rack units (denoted as RU, or simply U). The standard size for a RU is approximately 44.45 mm (1.75 in.) high. Rack-mountable equipment occupies one or more rack units. Racks are lined up side-by-side in rows. To assist with cooling, rows can be aligned front-to-front and back-to-back to form what are called cold aisles and hot aisles. A cold aisle can generally be at least 1.22 m (4 ft) wide to allow human access to the front panels of the racks. A hot aisle can generally be at least 0.9 m wide and is typically heated by the air exhaust from cooling fans or servers and other equipment mounted in the racks. Cables are generally passed into the hot aisles.

Cables can be routed between racks using one or more of several techniques. If the racks are in the same row, it can be simplest to run the cables inside the racks. Specialized wire management solutions can be used to facilitate routing of cables in this manner. For installations with many cables, the top one or two RUs of a rack can be left empty. If the racks are in different rows, the cables connecting racks can run along the ceiling, suspended in overhead cable trays. This is a standard practice because it reduces clutter and prevents safety hazards. Some data centers have raised floors with removable tiles. The space underneath the floor can also be used to route cables, including power cables.

A common Ethernet switch used in data centers is a "top-of-rack" (TOR) switch. Such switches typically occupy one RU switch that is placed in the top position in a rack and that connects to all of the computing nodes in that rack. These switches are becoming commodities due to the recent emergence of merchant silicon. Table 1 lists parameters of three types of switches typically used in DCNs. A top of rack GbE switch (TOR1G) can be a 48-port GbE/4-port 10 GbE switch for which prices typically range between approximately $2,500 and $10,000. A top of rack 10 GbE switch (TOR10G) is a 24-port 10 GbE switch for which prices typically range between $5,000 and $15,000. Both types of switches typically consume approximately 200 W of power.

TABLE 1

Parameters of representative DCN switches.

|  | TOR1G | TOR10G | EOR |
|---|---|---|---|
| GbE Ports | 48 | 0 | 0 |
| 10 GbE Ports | 4 | 24 | 128 |
| Power (W) | 200 | 200 | 11,500 |
| Size (RU) | 1 | 1 | 33 |

Another switch often used in data centers is an "end-of-row" (EOR) switch, which is typically placed in a rack, sometimes by itself due to its size. A number of nearby switches in other racks are typically connected directly to an EOR. EOR switches can also be referred to as modular switches, because they accept a variety of modules, called line cards, with different Layer 1 interfaces and different combinations of switching fabrics and network processors. The EOR listed in Table 1 is a 128-port 10 GbE switch for which a typical current price is generally between approximately $500,000 and $1,000,000.

Table 2 lists exemplary properties of Ethernet cables and transceivers. The term "Ethernet cable" usually refers to unshielded twisted pair (UTP) copper cable. UTP cable is available in different grades, which do not always correspond directly with IEEE Layer 1 standards. For example, Cat-5e UTP copper cable can allow GbE links of up to 100 m while Cat-6a UTP copper cable can allow 10 GbE links of up to 100 m, although shielded, twin-axial cable ("twinax") may be used as well to provide a 10 GbE link with a run of up to 15 m.

TABLE 2

Parameters of representative data center communication cables and transceivers.

|  | Cat-6 | Twinax | MMF120 | Units |
|---|---|---|---|---|
| Cable cost | 0.41 | 11.2 | 23.3 | $/m |
| Cable weight | 42 | 141 | 440 | g/m |
| Cable diameter | 5.5 | 7 | 25 | mm |
| Gigabit Ethernet | | | | |
| Standard | 1000BASE-T | N/A | 1000BASE-SX | |
| Range | 100 | N/A | 550 | m |
| Transceiver cost | 10 | N/A | 36 | $ |
| Transceiver power | 0.42 | N/A | 0.5 | W |
| 10 Gigabit Ethernet | | | | |
| Standard | 10GBASE-T | 10GBASE-CX4 | 10GBASE-SR | |
| Range | 30 | 15 | 300 | m |
| Transceiver cost | 100 | 100 | 250 | $ |
| Transceiver power | 6 | 0.1 | 1 | W |
| 40 Gigabit Ethernet | | | | |
| Standard | N/A | N/A | 40GBASE-SR4 | |
| Range | N/A | N/A | 300 | m |
| Transceiver cost | N/A | N/A | 600 | $ |
| Transceiver power | N/A | N/A | 2.4 | W |

Optical fiber cables are becoming more common in data centers as 10 GbE is introduced. While both multimode fiber (MMF) and single-mode fiber (SMF) are available, MMF is typically preferred because optical transceivers for multimode fiber are significantly less expensive. OM-3 "laser grade" MMF can allow 10 GbE links longer than 300 m. Distribution fiber cable can pack multiple fiber strands within a single physical cable. Typical densities are multiples of 12. A bidirectional link typically requires two fibers, so a 72-strand fiber cable can typically support 36 bidirectional communication channels. Implementations of the current subject matter can include data communications over one or more of UTP, twinax, optical fiber, and the like.

A transceiver converts signals between a circuit board and a communications cable, and an optical transceiver typically converts between an electrical signal and an optical signal. For UTP and twinax copper cable, transceivers can be packaged into a chip and placed directly onto a circuit board. These standards include 1000BASE-T, 10 GBASE-CX4, and 10 GBASE-T, for GbE over UTP, 10 GbE over twinax, and 10 GbE over UTP, respectively.

There are a number of different Layer 1 protocols for optical fiber, depending on the carrier wavelength, the bit rate, the encoding, multimode vs. single mode, etc. The networking industry has taken the 7-Layer OSI model quite literally by separating the Ethernet MAC functions (Layer 2) from the Ethernet physical layer (PHY) transceiver functions (Layer 1) through the use of pluggable optical transceiver modules. These modules are standardized by various Multi Sourcing Agreements (MSAs) to define standard mechanical and electrical form factors. This allows Ethernet device manufacturers to specialize in Layer 2 and Layer 3 functionality, and allows the end user to choose their desired Layer 1 protocol just by plugging in a module. The most common optical module standard for GbE is the SFP module. Recently, SFP+ has become the dominant standard for 10 GbE. These modules use the LC connector, which couples two fibers together into close proximity. The quad small form-factor pluggable (QSFP) transceiver is being developed for 40 GbE using an emerging standard to be named 40 GBASE-SR4. This module will be slightly larger than SFP and SFP+ modules and will use an MT connector with 8 optical fibers (4 send, 4 receive). MT connectors are available with up to 72 optical fibers.

3-tier fat-trees can employ a large number of 48-port GbE TOR switches to provide multiple Tb/s of bisection bandwidth. For example, a unit with 2,880 such TOR switches can provide 27.648 Tb/s of bisection bandwidth. However, such a configuration can be extremely difficult to construct because the high number of cable bundles. In the example with 2,880 48-port switches, 1,128 separate cable bundles can be required, each of which must be manually and independently routed and installed. Such a network can be partitioned into 48 separate pods (switches and servers) that communicate through a core switch array of 576 48-port switches. Assuming that a pod has a 3 m diameter and the distance between two pods is 1.5 m, such a configuration can require approximately 226,972 m of cable, weighing approximately 9,532 kg.

In some implementations, the current subject matter uses small fat-trees to gain the benefit of the fat-tree topology and commodity switches while minimizing the number of unique cable bundles. A conventional switching system can require k(k−1)/2 bundles where k is the number of pod switches. The top tier of the network in such systems is typically collocated with the k pod switches. However, by placing the top tier in a central location, only k bundles can be necessary required (from the pods to the central location). The use of optical fiber cable instead of copper cable can cut down the bulk of the cables required to carry a given data capacity because compared to copper, fiber is much thinner and lighter. Cables containing more than 72 fibers are readily available.

In an implementation, a fat-tree network can be based on a 24-port 10 GbE TOR switch. Such switches are currently available from various manufacturers for between $5K and $15K. Connecting 720 such switches into a 3-tier fat-tree topology can yield a bisection bandwidth of 34.56 Tb/s. Each of the 24 pods can contain as many as 24 switches, co-located in a single rack. The 144 core switches can be distributed over 4 racks. The 3,456 long fiber cables necessary to connect the switches can be combined into just 24 bundles of cable. With current component costs, the total cost of such a fat-tree network is estimated to be about $7.2M, which is $2,000 per port. This network is both less expensive and provides more bisection bandwidth than a traditional DCN constructed from modular packet switches.

Figure 2:
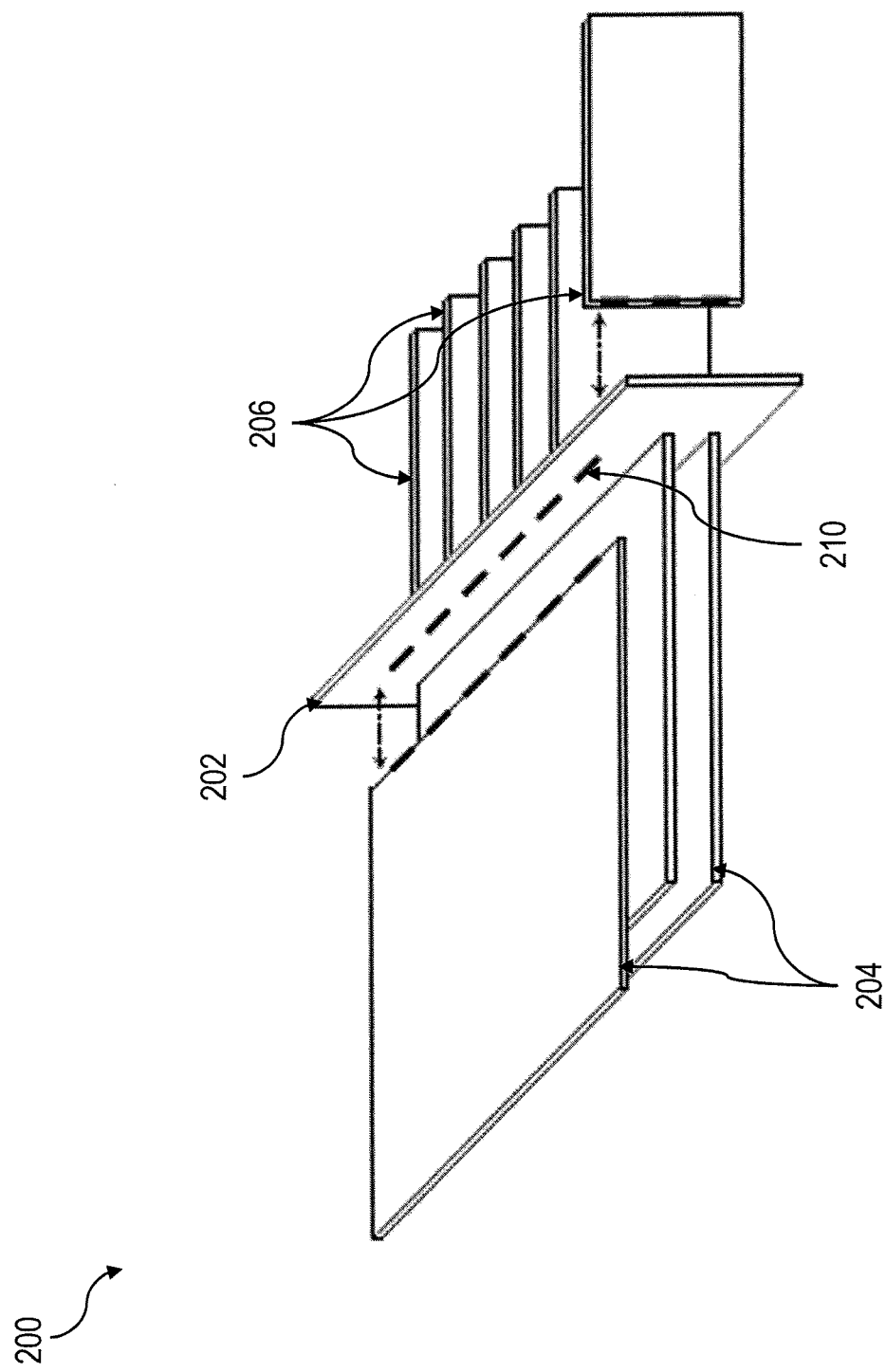
FIG. 2 is a perspective diagram showing an exemplary physical organization of a pod switch.

In some implementations of the current subject matter, a pod switch 200 can be constructed from multiple circuit boards assembled as shown in FIG. 2. A geometry for a pod switch according to implementations of the current subject matter can include a midplane circuit board 202 defining a first plane that is substantially orthogonal to at least one line card 204 and also substantially orthogonal to at least one daughter card or uplink card 206 which is or are also substantially orthogonal to the at least one line card 204. The midplane circuit board 202 is positioned centrally in the chassis of the pod switch 200 such that is can connect on one side to the at least one line card 204 and on an opposite side to at least one uplink card 206 through high-density high-speed electrical connectors. The midplane circuit board also provides power to all of the line cards 204 and daughter or uplink cards 206, and contains a CPU (not shown in FIG. 2) that manages the state of the pod switch 200. The midplane design provides a clean and simple interface allowing signals from each line card 204 to pass directly to each uplink card 206, and vice versa. In the implementation shown in FIG. 2, the line cards 204 can be mounted horizontally and the uplink cards 206 mounted vertically in a so-called horizontal-vertical arrangement. Other arrangements are possible.

Electrical connectors 210 for use in the pod switch 200 are typically inexpensive and can be obtained from several vendors. In one non-limiting example, the male connectors can be attached to the midplane circuit board 202 and the female connectors can be attached to the line cards 204 and uplink cards 206. Each connector can have at least 16 pins to support 8 differential channels of 10 GbE between each line card and each uplink card. In the example of FIG. 2, there are 18 connectors per pod switch 200, for example to connect three line cards 204 to six uplink cards 206, plus additional connectors for power distribution. Each of the three line cards 204 in FIG. 2 can provide 48 10 GbE ports directed toward computing nodes for a total of 144 such ports. Each of the six uplink cards 204 in FIG. 2 can provide six 40 GbE ports directed toward a core switch array for a total of 36 such ports. In some implementations, the pod switch 200 reduces the distance of the interconnections between the line cards 204 and the uplink cards 206, when compared to past interconnection techniques. This distance reduction may improve pod switch 200 performance because at higher speeds, such as for example speeds greater than 1 Gigabit per second, the longer the trace run, the larger the losses and associated electromagnetic effects.

In addition to these boards, the chassis can also contain a power supply units (PSU) and optionally, one or more redundant backup PSUs, which have been omitted from FIG. 2 for clarity. The at least one PSU can be located in a convenient location on the chassis, for example in the back of the chassis on the left and right sides of the uplink cards.

Figure 3:
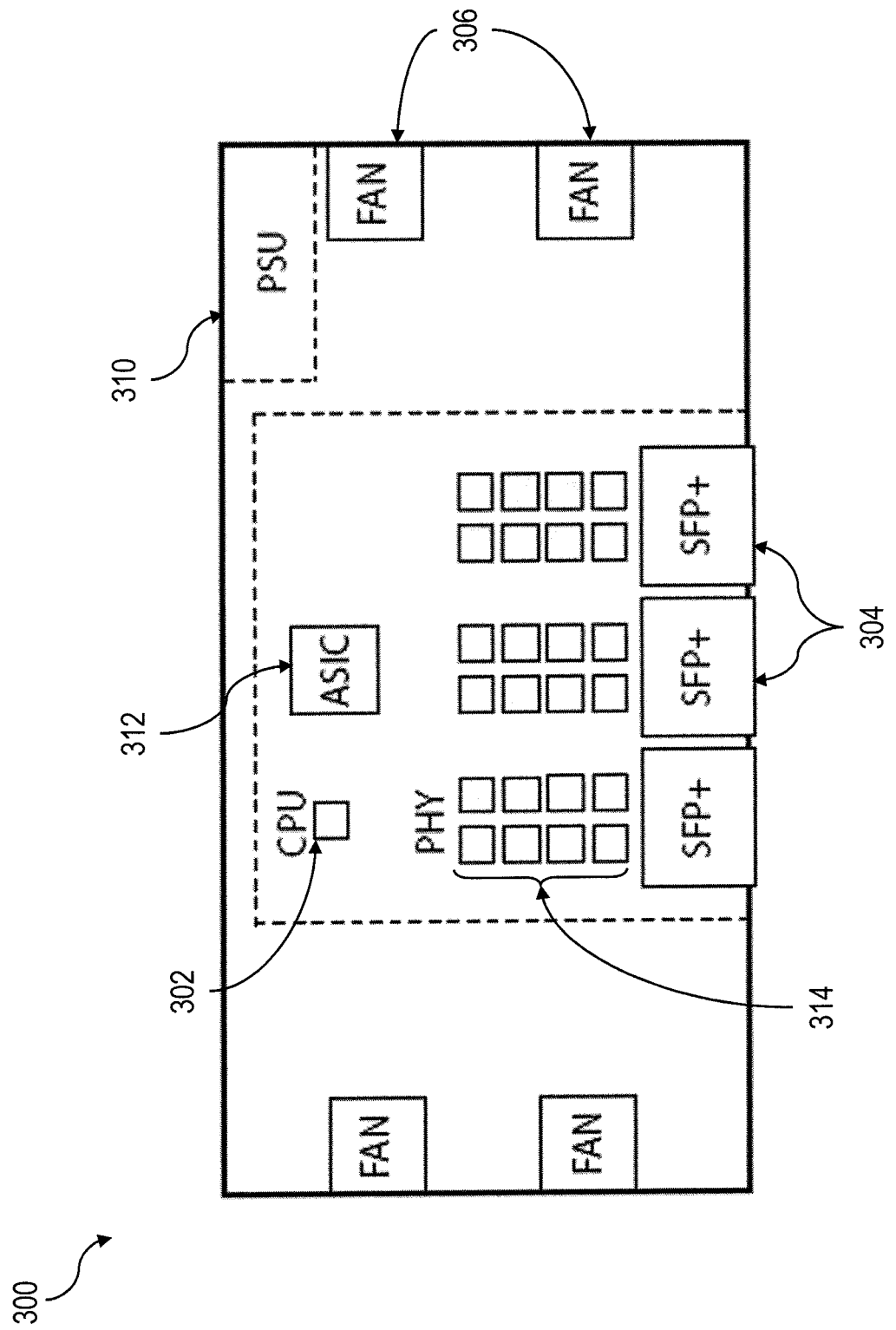
FIG. 3 is a schematic diagram showing an exemplary layout of a 24-port 10 GbE top-of-rack (TOR) switch.

FIG. 3 shows a board layout for an example of a 24-port 10 GbE TOR switch 300, which includes one or more central processing units 302, a 10 GbE small form-factor pluggable transceiver (SFP+) 304, one or more fans 306, one or more power supply units (PSU) 310, one or more application specific integrated circuits (ASICs) 312, and a number of PHYs (314). In the example of FIG. 3, each SFP+ 304 provides 8 ports and an associated 8 PHYs (314). Table 3 shows representative costs and power consumptions of components typically associated with such a switch. A switch ASIC 312 by itself is not an Ethernet switch, but rather just a fast path. To build a functional switch, several other chips as well as software for handling networking protocols, such as for example Minimum Spanning Tree or Open Shortest Path First (OSPF), can also be included. Such software can run on the local CPU 302, which need not be very powerful since the amount of required computation is typically small. Common operating systems can include Linux and VxWorks (available from Wind River Systems of Alameda, Calif.). The CPU 302 can also include one or more supporting chips (not shown in FIG. 3) such as, for example, dynamic random access memory (DRAM) for system memory, flash for secondary storage, other memory or data storage chips, and the like.

TABLE 3

Representative parts costs and power consumption of switch components.

| Part | Cost ($) | Power (W) |
| --- | --- | --- |
| ASIC | 410 | 22 |
| CPU | 130 | 8 |
| PHY | 10 | 0.8 |
| SFP+ | 250 | 1 |
| EEP | 10 | 2 |
| QSFP | 600 | 2.5 |

The PHY chips 314, which are used to bridge a Layer 1 protocol supported by the ASIC 312 with a Layer 1 protocol exposed by the switch. For example, an ASIC 312 may only support a 10 Gb attachment unit interface (XAUI) natively, but by adding a PHY chip 314 to the switch 300, the XAUI protocol can be converted into 10 GBASE-T, which allows Cat-6a cables to be connected to the switch 300.

The three classes of chips (ASICs, CPUs, and PHYs) are generally the primary building blocks of switches and routers. Sometimes switches will contain other chips such as flash memory for nonvolatile storage or field programmable gate arrays (FPGAs) for glue logic. Power supply units (PSUs) and fans can also be included. Although optical transceiver modules are not technically part of the switch, they are included in the current analysis due to their typically substantial contribution to the overall cost and power consumption of a switching system.

Figure 4:
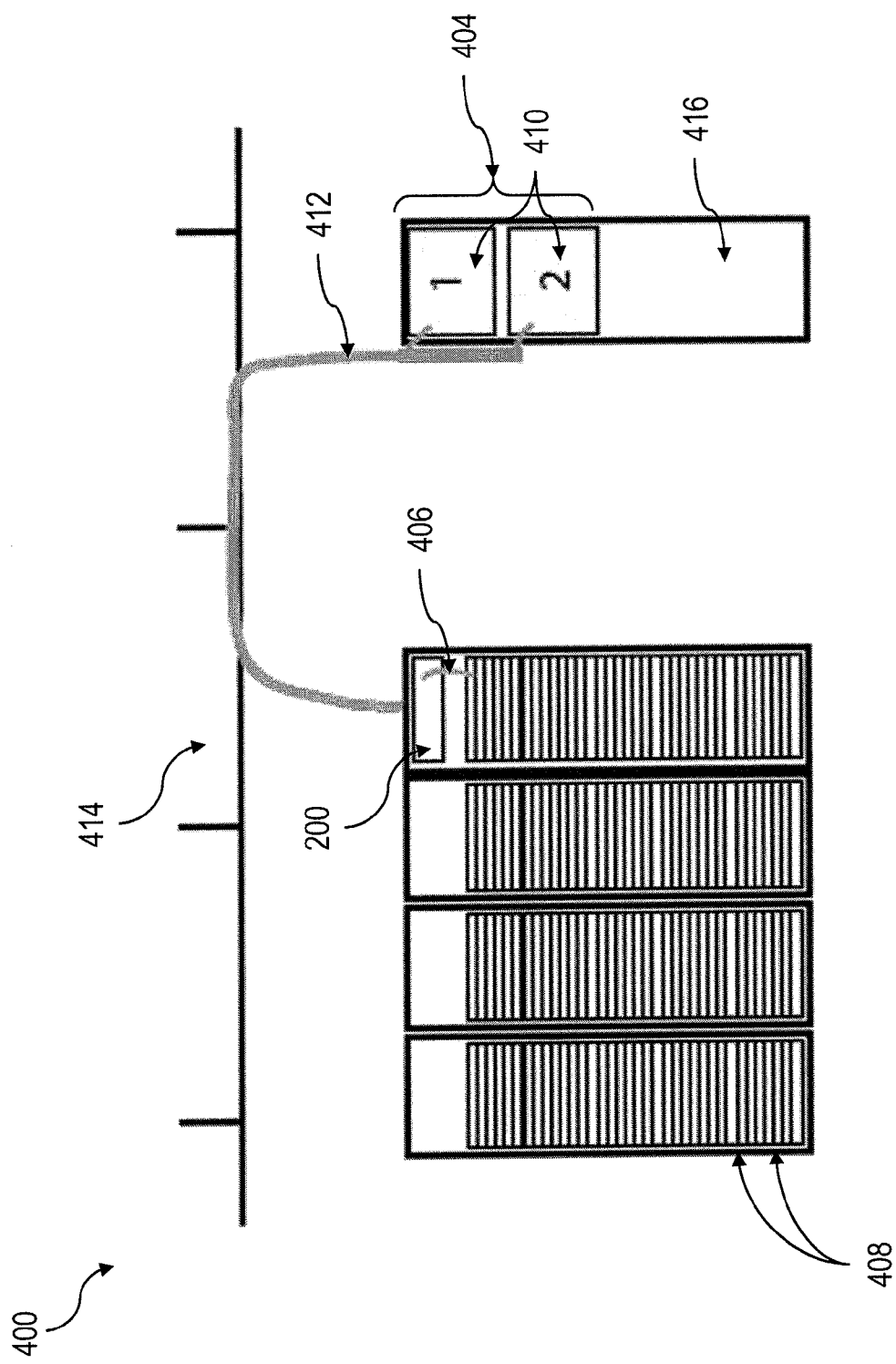
FIG. 4 is a schematic diagram showing an exemplary deployment of a 3,456-port switch.

In an illustrative implementation of the current subject matter, a 3,456-port 10 GbE switch composed substantially of merchant silicon connected in a fat-tree topology. In contrast, large Ethernet switches from traditional network equipment manufacturers use multiple proprietary ASICs and a crossbar topology. In contrast, the current subject matter can provide a simple and completely optional ASIC called the Ethernet extension protocol (EEP) to further reduce the cost, power consumption, and cabling complexity of the overall design. The EEP is described in greater details below. FIG. 4 shows an overview of such a 3,456-port switch 400 according to an implementation of the current subject matter. Rather than one monolithic switch, the design can be separated into 24 pod switches 200 and a core switch array 404. In the example of FIG. 4, a pod switch 402 can occupy four rack units of space and can provide data connections via, for example 144 10 GbE cables 406 to 144 computing nodes 408. Only one such cable 406 is shown in FIG. 4 for clarity. Each of two modules 410 of the core switch array 404 can occupy 9 rack units of space. A pod switch 402 can include the bottom two tiers of the fat-tree topology 100 as shown in FIG. 1 while the core switch array 404 forms the top tier of the fat tree topology 100.

Each pod switch 402 can function as a standalone 144-port 10 GbE switch. When connected to the core switch array 404, the pod switches 200 act as a single non-interfering switch. The pod switches 200 can also be incrementally deployed as the network is built out. When fully deployed, the switch 400 can have 3,456 ports and 34.56 Tb/s of bisection bandwidth. Each pod switch 200 can connect to the core switch array 404 with four parallel cables 412, each carrying 72 multimode fibers. These cables 412 can be routed from the pod switch 200 to the rack carrying the core switch array 404 via an overhead cable tray 414.

The core switch array 404 is not a monolithic switch, but rather a collection of 144 individual 24-port switches. As noted, the core switch array 404 can be separated into two or more modules 410 to provide fault tolerance and to allow some degree of incremental deployment. It is also possible to divide the core switch array 404 into four modules 410. However, the overall costs of the switch can begin to increase as the number of modules 410 increases. FIG. 4 shows the core switch array 404 installed into a single rack 416 for illustration purposes, but in actual deployment, the modules 410 can be physically separated to provide fault tolerance of critical network infrastructure, such as for example in the case of a localized power failure.

Figure 5:
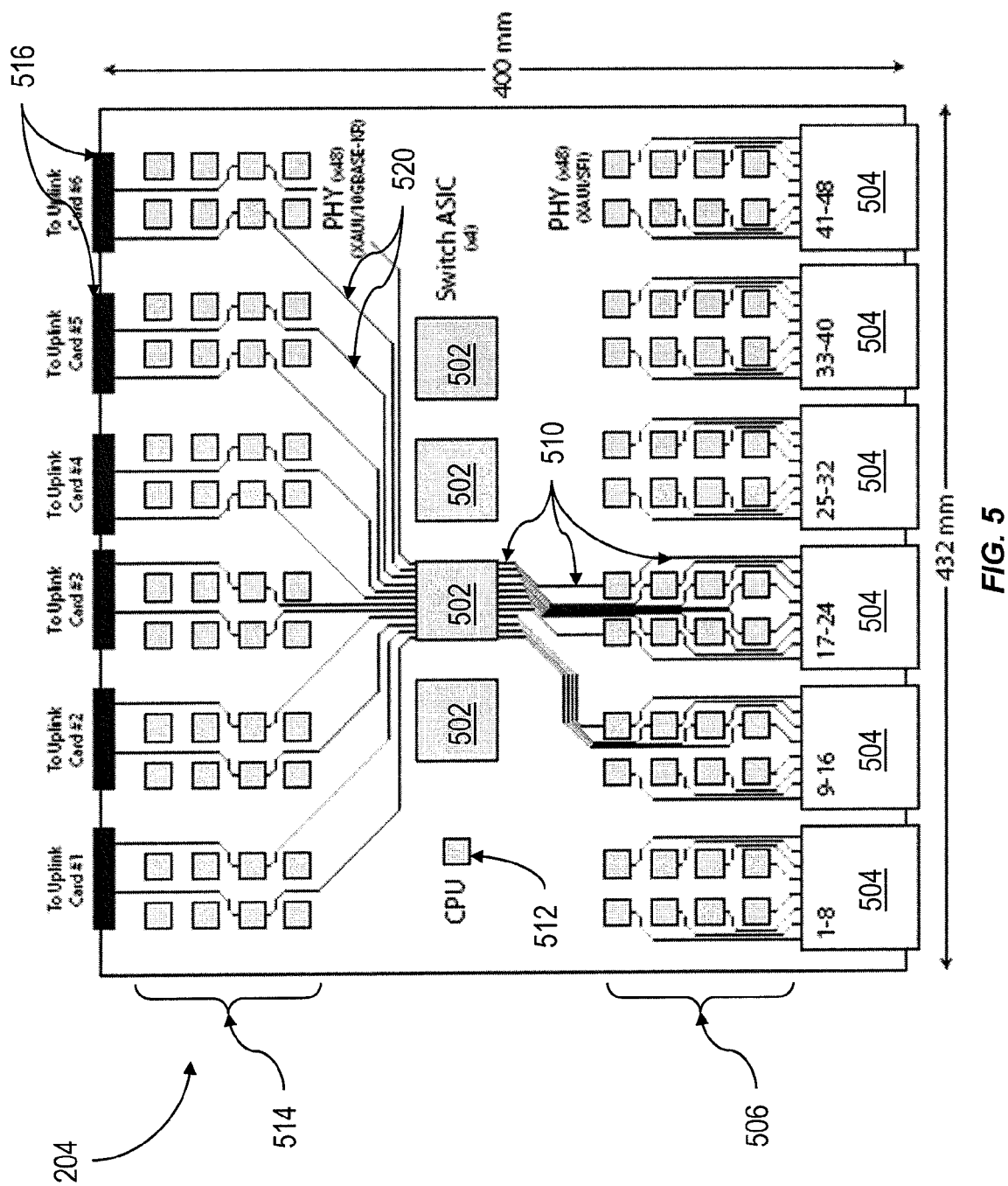
FIG. 5 is a schematic diagram showing an example of a pod switch line card.

FIG. 5 shows an exemplary layout of the line card 204 according to an implementation of the current subject matter. The line card 204 shown in FIG. 5 can replace four discrete 24-port switches, such as for example that shown in FIG. 3, from the edge layer of the network and can help reduce or eliminate redundant components. The four switch ASICs 502 separate the board into two halves. The bottom half of the board contains 48 line SFP+ optical transceiver cages 504 and 48 line PHY chips 506, to convert between a SFP+ 10G electrical interface (SFI) and the IEEE XAUI standard for 10 GbE. FIG. 5 shows solid traces 510 running from the line SFP+ cages 504 to the line PHYs 506, to one of the line switch ASICs 502. The line SFP+ cages 504 provide connections to the computing nodes. The other traces are shown with dotted lines to indicate that they also continue, but have been removed from the diagram for clarity. FIG. 5 also includes a line CPU 512 shown off to the side which connects directly to the four-switch line ASICs 502 via a PCI Express bus (not shown). This configuration can allow software running at the line CPU 512 to configure the line switch ASICs 502, and can further allow exceptional Ethernet frames to be sent from the line switch ASICs 502 over the PCI Express bus to the line CPU 512 for further processing.

Also as shown in the top half of FIG. 5, the line card 204 can include an 48 additional line PHYs 514 and six additional line electrical connectors 516 each configured to interface with an uplink card 206 via a midplane circuit board 202 (neither of which are shown in FIG. 5). These additional line PHYs 514 can convert between XAUI and 10 GBASE-KR, which is the IEEE standard for 10 GbE over backplanes. 10 GBASE-KR can exhibit greater robustness than XAUI when passing between different boards. FIG. 5 also shows additional traces 520 from a line switch ASIC 502 to one row of additional line PHYs 514 on the top half of the line card 204. Two traces from each line switch ASIC 502 can be routed to each of the uplink cards 206 via the additional line electrical connectors 516.

Figure 6:
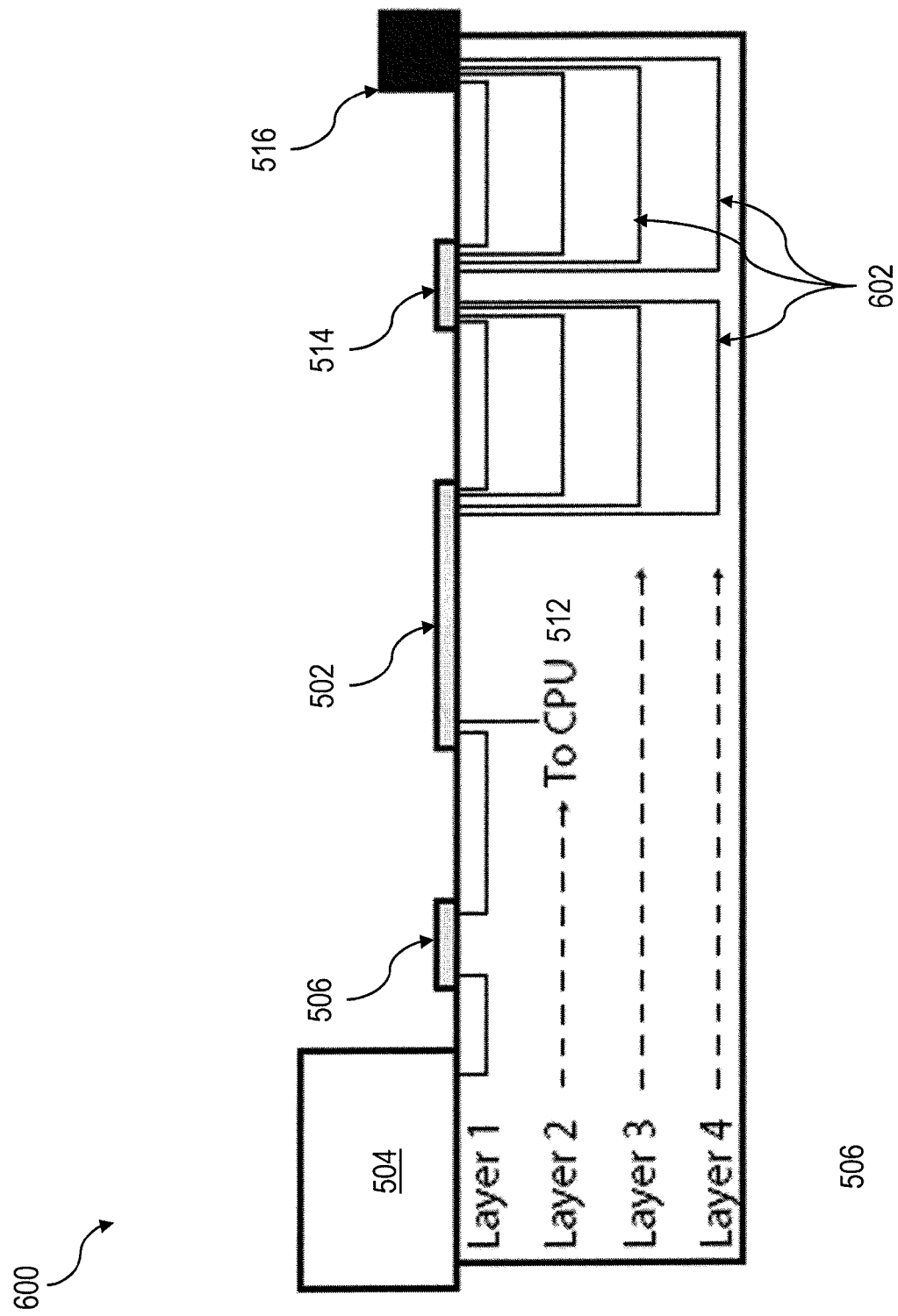
FIG. 6 is a schematic diagram showing an example of layers of a pod switch line card circuit board.

Circuit boards can be divided into multiple layers and can be categorized as either signal layers or power/ground layers. FIG. 6 shows of cross sectional diagram 600 of a line card 204 having four separate signal layers that allow routing of all copper traces. Congestion can occur in the top half of the board where each switch ASIC 502 connects to each connector 602.

Figure 7:
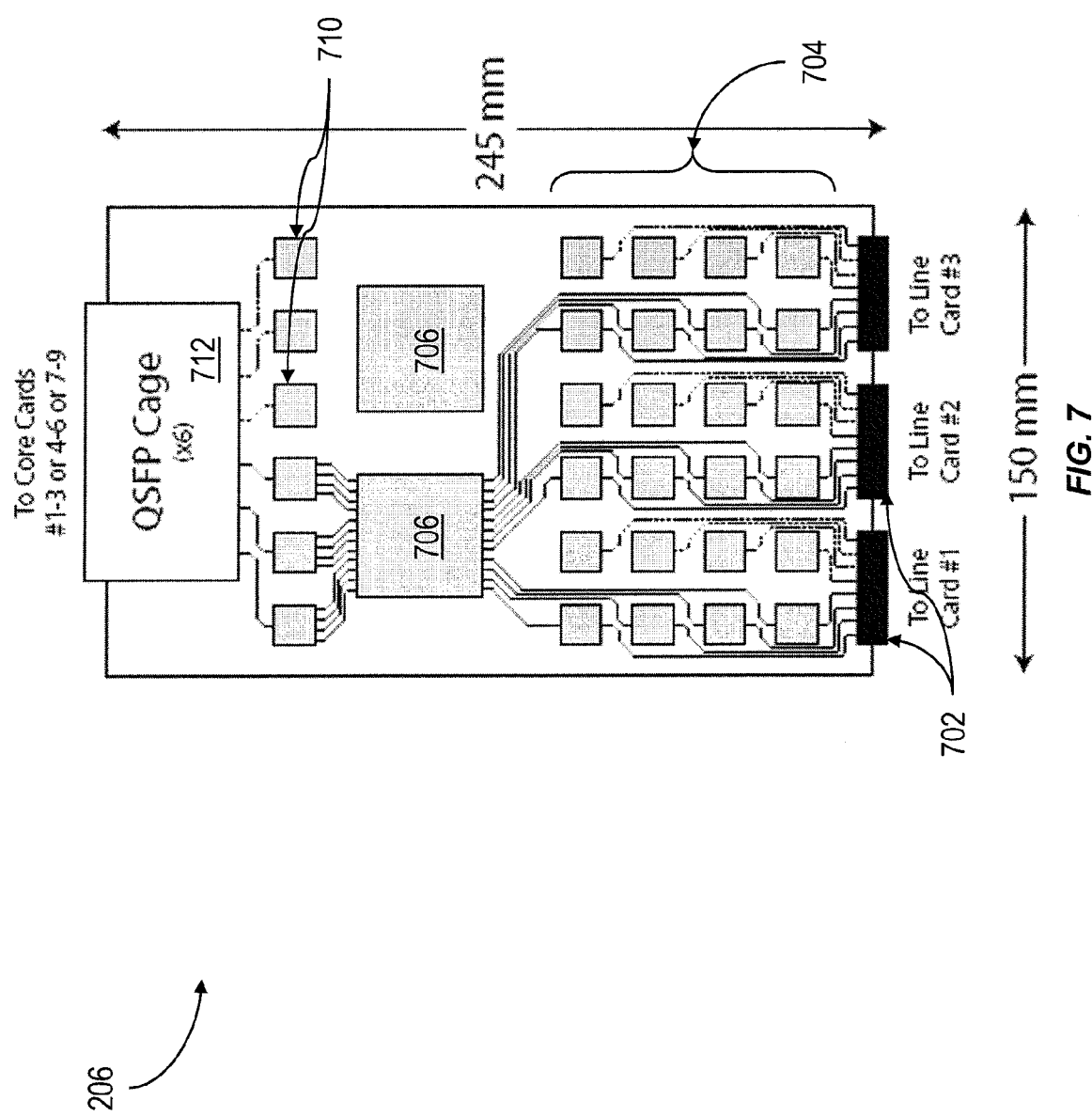
FIG. 7 is a schematic diagram showing an example of a pod switch uplink card.

The uplink card 206 can perform at least two functions. First, it can act as a switch fabric for the pod switch 200, allowing the line switch ASICs 502 on the line cards 504 to connect to each other. Second, it can forward traffic to and from the core switch array 410. FIG. 7 shows an example of a layout of an uplink card 206. Each uplink card 206 can replace two discrete 24-port switches from the aggregation layer of the network. Like the line card 204, the uplink card 206 can also include two halves. The bottom half shown in FIG. 7 can connect to the midplane circuit board 202 with uplink electrical connectors 702, of which there are three in FIG. 7, each for one of the line cards 204 in FIG. 2. The traces from the uplink electrical connector 702 corresponding to each line card 204 are routed to uplink PHYs 704, of which there are eight in FIG. 7, and then split between two uplink switch ASICs 706. In FIG. 7, traces connecting to the one of the two uplink switch ASICs 706 are shown as solid lines, whereas traces connecting to the second of the two uplink switch ASICs 706 are partially shown as dotted lines. This half of the uplink card 206 can require two separate signal layers.

The top half of the board can contain uplink EEP ASICs 710 and uplink QSFP cages 712, of which there are six of each in FIG. 7. Each uplink EEP ASIC 706 connects to four ports of its corresponding uplink switch ASIC 706 using, for example, the XAUI protocol and connects to one of the uplink QSFP modules 710 using, for example, the QSFP electrical interface. The uplink EEP ASIC 710 is described in more detail below. In the uplink card 206 shown in FIG. 7, the top half of the uplink card 206 can aggregate 24 ports of 10 GbE into 6 ports running the custom EEP protocol at 40 Gb/s.

Most exceptional packet processing can be performed on either the line card 204 or in the core switch array 404, rather than on the uplink card 206. Thus, a dedicated CPU can be omitted from the uplink card and instead, all uplink cards 206 can be managed by a system-level CPU located on the midplane circuit board 202. It is also possible to place a CPU on each uplink card with a modest increase in cost.

Figure 8:
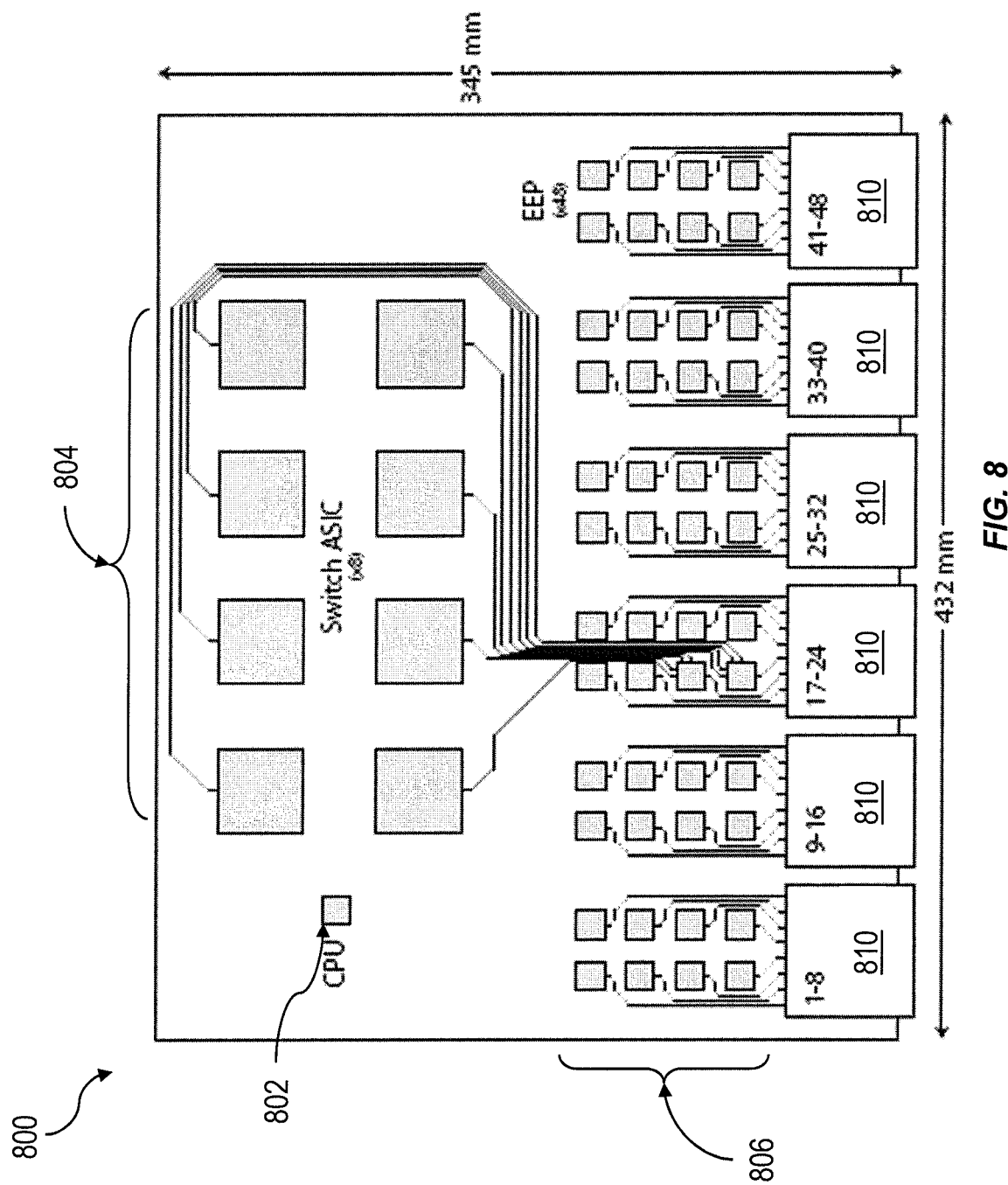
FIG. 8 is a schematic diagram showing an example of a core switch array card.

The core switch array 404 can, in some implementations, include 18 independent core switch array cards 800, partitioned into two modules 410 with 9 cards each. An example of such a core switch array card 800 that can provide functionality of the core switch array 404 is shown in FIG. 8. The choice of packaging for the core switch array 404 is largely arbitrary since the separate 24-port switches on each core switch array card 800 do not communicate with each other directly. The core switch array cards 800 do not connect to a backplane and their co-location is merely a matter of simplifying cable management and packaging. The absence of a backplane can greatly reduce the cost of the core switch array 404 and readily permits scaling of the current subject matter to even larger fat-tree switches in the future.

Each core switch array card 800 such as that shown in FIG. 8 can replace eight discrete 24-port switches from the core layer of the network. In the implementation of FIG. 8, each core switch array card 800 can contain a CPU 802, core switch ASICs 804 (of which there are eight in FIG. 8), core EEP ASICs 806 (of which there are 48 shown in FIG. 8), and core QSFP modules 810 (of which there are 48 shown in FIG. 8). FIG. 8 shows eight traces from two core EEP ASICs 806 connecting to the eight different core switch ASICs 804. Although there can be a total of 192 connections between the core EEP ASICs 806 and the core switch ASICs 804, these connections can be provided in as few as eight signal layers— one per core switch ASIC 804. A ninth signal layer can be included for the CPU 802 to connect to the core switch ASICs 804. Current circuit board manufacturing techniques can make it difficult to design boards with more than 10 signal layers, so a layout as described herein can be the most efficient in terms of board area utilization without becoming an engineering challenge. More exotic designs may be able to double the number of signal layers to 20 or even more, but the engineering challenge using currently available techniques increases correspondingly.

Figure 9:
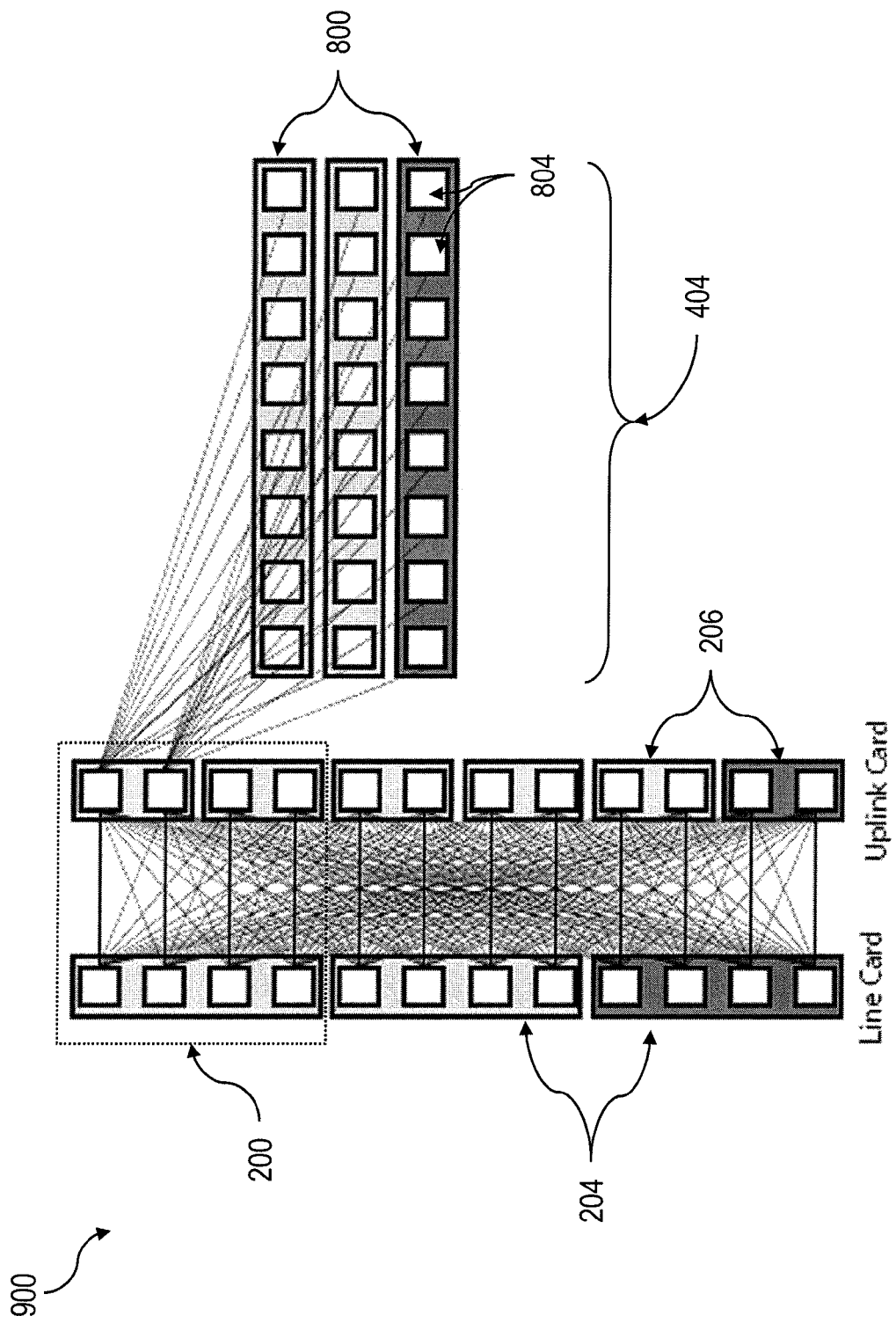
FIG. 9 is a schematic diagram showing an exemplary topology of a 3,456-port switch.

FIG. 9 shows an example of an internal topology diagram 900 of a 3,456-port switch 400. In order to achieve full bisection bandwidth, each pod switch 200 must connect to each of the 144 switch ASICs 804 at the core switch array card 800. If a mistake is made when constructing the network, a pod switch 200 might end up with two or more parallel links to the same core switch ASIC 804, which would subtract from the overall bisection bandwidth.

An EEP protocol according to the current subject matter can help prevent such installation mistakes. The four links leaving an uplink ASIC on a pod switch uplink card 206 can travel to a single core switch array card 800, where they connect to four different core switch ASICs 804. The core switch array card 800 can be designed such that a top row of 24 of the core QSFP modules 810 connect only to a top row of core switch ASICs 804, and a bottom row of core QSFP modules 810 connect only to a bottom row of core switch ASICs 804. In such a configuration, as long as each pod switch 200 connects to exactly one upper and one lower port on each core switch array card 800, the network can achieve full bisection bandwidth.

As noted above, the current subject matter allows supports incremental deployment. A very small network can start with a single pod switch 200 and no core switch array 404. Each pod switch line card 204 can be installed as more ports are needed. However, all of the uplink cards 206 for which the pod switch 200 is designed (for example, six as in FIG. 2) are advantageously installed for non-interfering throughput. Uplink cards 206 can also be installed incrementally to reduce cost or if some degree of oversubscription can be tolerated. In the pod switch 200 of FIG. 2, each uplink card 206 can provide a sixth of the total aggregate bandwidth available from the pod switch 200.

For a single pod switch 200, the QSFP modules of the core switch array card 800 are not needed. A single pod switch 200 can provide up to 1.44 Tb/s of bisection bandwidth. Adding a second pod switch 200 can require the installation of the core switch array 404. However, if fault tolerance is not a concern, then it is possible to install just one of the two core switch array modules 410. Also, if some degree of oversubscription can be tolerated, then not all nine core switch array cards 800 need be installed. Each core switch array card 800 can provide one eighteenth of the total aggregate bandwidth available from the core switch array 404 of the example shown in FIG. 4.

One core switch array module 410 can support up to 12 pod switches 200 with no oversubscription. In this deployment, each pod switch 200 can connect all of its uplink cables 412 to the same core switch array module 410, rather than splitting them between the two modules 410 as shown in FIG. 4. However, once a thirteenth pod switch 200 is installed, both core switch array modules 410 can become necessary. The four 72-strand fiber cables 412 from each of the pod switches 200 are then distributed evenly among the core switch array cards 800 of the core switch array modules 410. This could require disconnecting and reconnecting a small number of cables.

Comparing an exemplary implementation to other approaches to providing a 3,456-port fat-tree switch can highlight several possible advantages of the current subject matter. The three example network configurations are designated as Network 1, Network 2, and Network 3. Network 1, which includes 720 discrete 24-port 10 G TOR switches, such as for example TOR10G in Table 1, connected in a fat-tree topology, can be constructed immediately without any hardware engineering. All inter-switch links can use 10 Gb/s small form-factor pluggable (SFP+) optical transceivers and multi-mode fiber cable. Network 2 uses board and chassis designs according to the current subject (for example as shown in FIG. 2, FIG. 5, FIG. 7, and FIG. 8). However, Network 2 does not use EEP or 40 GbE quad small form-factor pluggable (QSFP) transceiver modules. Instead, Network 2 simply replaces these components with additional 10 GbE PHYs and SFP+ modules. Network 3 uses a design similar to implementations of the current subject matter as shown in FIG. 2, FIG. 5, FIG. 7, and FIG. 8 and discussed in reference thereto with EEP. Such a design has the highest non-recurring engineering (NRE) costs of the three examples because it generally requires board, chassis, and ASIC design. However, the higher NRE costs can readily translate into lower capital and operational costs. In order to eliminate non-comparable costs such as software engineering and profit margins, for this analysis, all three designs are reduced to their major hardware components, for example chips and optical transceivers, while certain components such as circuit boards, power supplies, fans, chassis, and cables are omitted. The omitted components are not expected to contribute more than 10% of the total cost or power consumption.

Use of EEP according to implementations of the current subject matter can be quite beneficial in light of the properties of optical transceivers. As shown in Table 4, it can be substantially less expensive in terms of cost, power consumption, and physical area to aggregate to higher-rate links, and then to disaggregate back to an original rate because higher-rate transceivers are typically more efficient both in cost and in power consumption. The prices shown in Table 4 are estimates provided by a large OEM manufacturer, and are expected to change over time.

TABLE 4

Representative optical transceiver standards.

|  | SFP | SFP+ | QSFP |
|---|---|---|---|
| Rate | 1 Gb/s | 10 Gb/s | 40 Gb/s |
| Cost/Gb/s | $35 | $25 | $15 |
| Power/Gb/s | 500 mW | 150 mW | 60 mW |

Table 5 lists part counts for the three example networks. By repackaging the components, a significant number of SFP+ modules can be eliminated. Adding EEP and QSFP modules can further reduce part counts.

TABLE 5

Part counts for three example network configurations.

|  | Network 1 | Network 2 | Network 3 |
|---|---|---|---|
| ASIC | 720 | 720 | 720 |
| CPU | 720 | 132 | 132 |
| PHY | 17,280 | 17,280 | 10,368 |
| SFP+ | 17,280 | 10,368 | 3,456 |
| EEP | 0 | 0 | 1,728 |
| QSFP | 0 | 0 | 1,728 |

Table 6 lists cost and power consumption estimates for the different parts. Power consumption estimates were obtained from data sheets and product briefs. Cost estimates, which were obtained from distributors, necessarily represent a snapshot in time and may change with the marketplace.

TABLE 6

Representative cost and power consumption estimates for part in Table 5.

| Part | Cost ($) | Power (W) |
|---|---|---|
| ASIC | 410 | 22 |
| CPU | 130 | 8 |
| PHY | 10 | 0.8 |
| SFP+ | 250 | 1 |
| EEP | 10 | 2 |
| QSFP | 600 | 2.5 |

Table 7 compares several additional characteristics of the three example networks. Although all three networks have equivalent bisection bandwidth, Network 2 is strictly better than Network 1 and Network 3 is strictly better than Network 2. Table 7 does not account for one-time NRE costs, which can be larger for Network 3 than for Network 2 due to the EEP ASIC. Table 7 shows that the largest gains come from repackaging the fat-tree. The EEP ASIC also provides a significant improvement.

TABLE 7

Comparison of representative parameters of example network configurations.

|  | Network 1 | Network 2 | Network 3 |
|---|---|---|---|
| Bisection Bandwidth (Tb/s) | 34.56 | 34.56 | 34.56 |
| Cost ($M) | 4.88 | 3.07 | 2.33 |
| Power Consumption (kW) | 52.7 | 41.0 | 36.4 |
| Cabling Complexity | 3,456 | 96 | 96 |
| Space (Rack Units) | 720 | 192 | 114 |

Optical transceiver modules can account for approximately 21% of the overall power consumption and approximately 81% of the overall cost of Network 3. Thus, further developments in efficiency and cost of optical transceiver module technology will add further benefits to the current subject matter. Less expensive optical transceivers currently in development utilize recent advances in photonic integrated circuits to allow multiple optical transceivers to be fabricated on a single chip. For example, chips available from Luxtera (Carlsbad, Calif.) can be used to build a 40 Gb/s active cable, which is a fiber cable with transceivers permanently attached to both ends.

In further implementations, as noted above, the current subject matter can include an EEP ASIC, which functions as an Ethernet traffic groomer to aggregate frames from multiple low-rate links and tunnel them over a single higher-rate link.

Two standards currently exist for traffic grooming: synchronous optical networking and synchronous digital hierarchy (SONET/SDH) and IEEE 802.1ad. SONET/SDH was designed for transporting both voice and data traffic over long distances of optical fiber while also supporting quality of service (QoS) and providing very low jitter. IEEE 802.1ad, which supports virtual local area network (VLAN) tunneling, can bridge multiple remote Ethernet networks connected to a single carrier network.

SONET/SDH can provide excessive functionality with a corresponding higher overhead than is necessary for the current task. At the same time, IEEE 802.1ad requires an entire Ethernet frame to be stored on chip before forwarding it through a higher-rate port. This is a limitation of the Ethernet protocol, which does not allow frame fragmentation. Store-and-forward can become a significant source of latency, especially when used in a multi-stage switch such as a fat-tree.

A lightweight protocol, called the Ethernet extension protocol (EEP), has therefore been developed to eliminate the latency and buffering requirements of IEEE 802.1ad. EEP as described herein includes techniques from other synchronous protocols, such as for example asynchronous transfer mode (ATM). EEP can be very simple, can require little or no configuration, and can be completely invisible to the rest of the network. Because of these features, EEP can be compatible with current data center bridging efforts such as IEEE 802.1Qau, 802.1Qaz, and 802.1Qbb.

Figure 10:
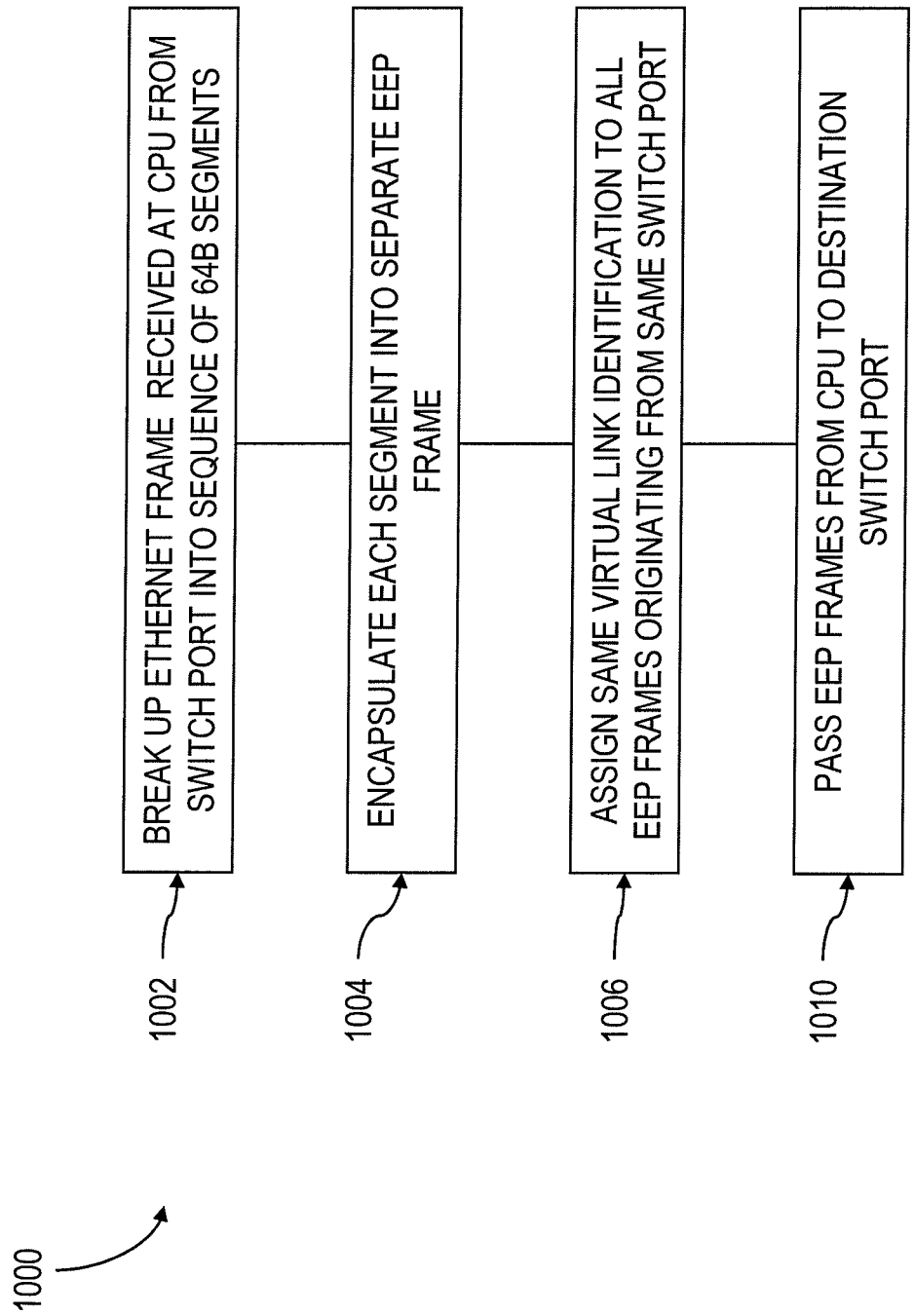
FIG. 10 is a process flow chart illustrating a method of data transfer using an Ethernet extension protocol (EEP)

EEP provides for abstraction of a set of 16 virtual Ethernet links, multiplexed over a single physical Ethernet link. As shown in the process flow diagram 1000 of FIG. 10, EEP breaks up an Ethernet frame received at the CPU from a switch port into a sequence of 64B segments at 1002, and encapsulates each segment into an EEP frame at 1004. At 1006, each EEP frame originating from the same switch port can be assigned the same Virtual Link Identification (ID), which is similar to a VLAN tag. The EEP frames are passed from the CPU to a destination switch port at 1010.

Figure 11:
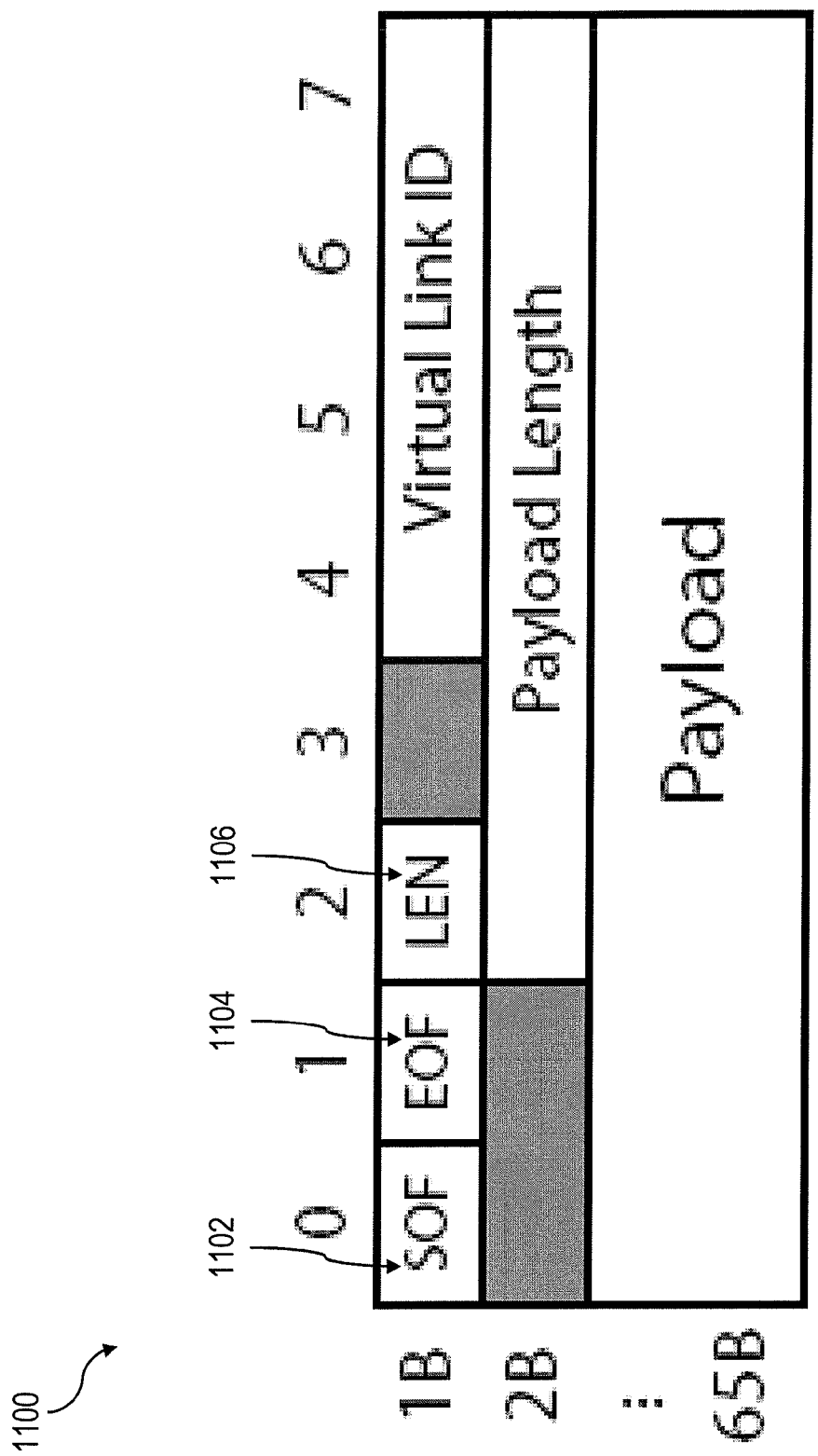
FIG. 11 is a data block diagram showing an example of an Ethernet extension protocol (EEP) frame format.

FIG. 11 shows an example EEP frame format 1100. The first EEP frame in the sequence, which corresponds to the first 64B of an Ethernet frame, has the start of frame (SOF) bit 1102 set. All other EEP frames in the sequence have the SOF bit cleared. The last EEP frame has the end of frame (EOF) bit 1104 set. The last EEP frame will likely not have a 64B payload. In this case, the length (LEN) bit 1106 is set, which indicates that the second byte in the EEP frame is part of the header rather than the payload. This second header byte records the number of valid bytes in the payload. In the common case, each EEP frame can use one header byte. Only final EEP frames use two header bytes. Three unused bits are reserved for future use.

While IEEE 802.1ad is limited to store-and-forward, EEP can use cut-through switching to begin transmitting an Ethernet frame on an output port after the first EEP frame has been received. However, care should be taken when using cut-through switching. The EEP receiver should never run out of bytes part way through the transmission of an Ethernet frame, as this can corrupt the frame. Such a scenario can be avoided if the EEP transmitter services the input queues in a timely and round-robin fashion. If an EEP frame happens to be dropped and omitted from a reassembled packet, the frame check sequence (i.e., checksum) can invalidate the larger Ethernet frame, since it is passed on as part of the EEP payload.

EEP can add overhead to a link. For example, a standard 1500B Ethernet payload can actually require 1538B for transmission after accounting for the preamble, header, frame check sequence, and inter-frame gap. Thus, EEP can add an additional 25B of headers to create 24 EEP frames from the original Ethernet frame. Normally, this would reduce the capacity of the link by 1.6%, a small but annoying amount. However, the PHYs and the optical transceivers can be overclocked by at least 1.6% to recover the lost capacity. This technique is frequently used in both proprietary and merchant silicon.

In an illustrative example, both IEEE 802.1ad and EEP were implemented in hardware using a Xilinx Virtex-5 LX110T FPGA. Due to limited resources, the implementation was simplified to use four GbE ports and one 10 GbE port rather than four 10 GbE ports and one 40 GbE port. However, the design also clearly generalizes to faster rates. The custom logic used in this example totaled 3,480 lines of the hardware description language Verilog-2001 and internet protocols available from Xilinx, Inc. (San Jose, Calif.) was used for the PHY, media access control (MAC), and first in-first out (FIFO) cores. The designs were verified using a custom test bench totaling 1,200 lines of SystemVerilog-2005 and the designs were simulated with ModelSim 6.4, which is available from Mentor Graphics (Wilsonville, Oreg.). Version 10.1 of Xilinxo Synthesis Technology, available from Xilinx, Inc., was used for logic synthesis. Table 8 shows results of this comparison, including a percentage of the field programmable gate array (FPGA) was used for each approach. The EEP implementation is slightly smaller because of leveraging of cut-through switching to reduce the buffer size. The EEP implementations were actually small enough to fit into the second smallest interlaced extensible trace (LXT) device available from Xilinx, indicating that an ASIC conversion would produce an extremely inexpensive and low power chip.

TABLE 8

Device utilization parameters for IEEE 802.1ad - EEP comparison.

|  | IEEE 802.1ad | EEP |
| --- | --- | --- |
| Flip Flops | 5,427 (7%) | 4,246 (6%) |
| LUTs | 6,243 (9%) | 5,004 (7%) |
| BlockRAM/FIFOs | 11 (7%) | 0 (0%) |

Some merchant silicon vendors offer custom ASIC design services, in which customer logic and IP can be integrated directly into one of their existing devices. For example, Broadcom Corp. (San Diego, Calif.) offers this service. EEP and other PHYs could thus be directly integrated onto an existing 24-port 10 GbE switch ASIC to further reduce cost and power.

Figure 12:
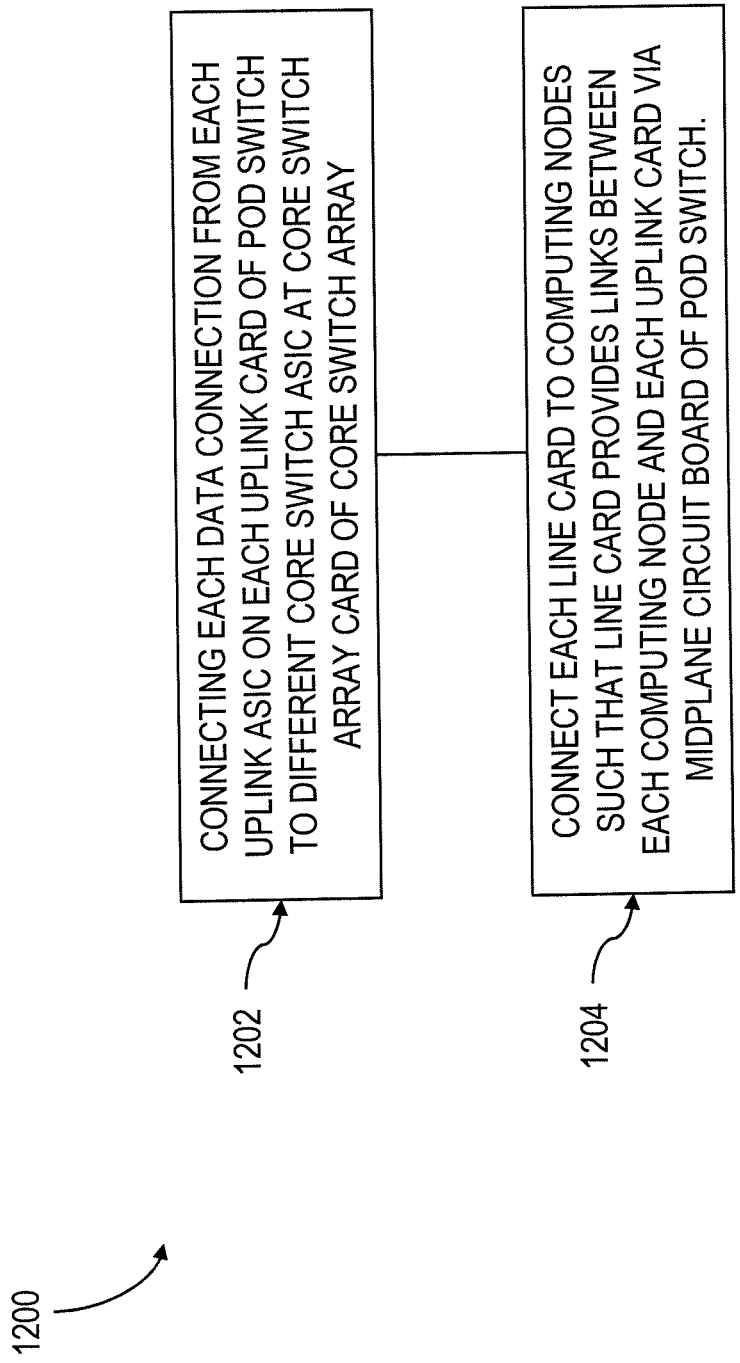
FIG. 12 is a process flow chart illustrating a method of creating a high speed switching network.

FIG. 12 shows a process flow chart 1200 illustrating a method for creating a high speed switching network that includes pod switches 200 such as those described above that each include one or more uplink cards 206 connected to one or more line cards 204 through a midplane circuit board 202 such that the one or more uplink cards 206 are disposed substantially in parallel to one another and orthogonal to the midplane circuit board 202 and the one or more line cards 204 are disposed in parallel to one another and orthogonal to the midplane circuit board 202 and also to the one or more uplink cards 206. At 1202, each of a plurality of data connections from each of a plurality of uplink ASICs on each uplink card 206 of the pod switch 200 are connected to a different one of a plurality of core switch ASICs at a core switch array card 800 of a core switch array 404. At 1204, each line card 204 is connected to a plurality of computing nodes 408 such that the line card 204 provides links between each computing node 408 and each of the one or more uplink cards via the midplane circuit board 202.

Figure 13:
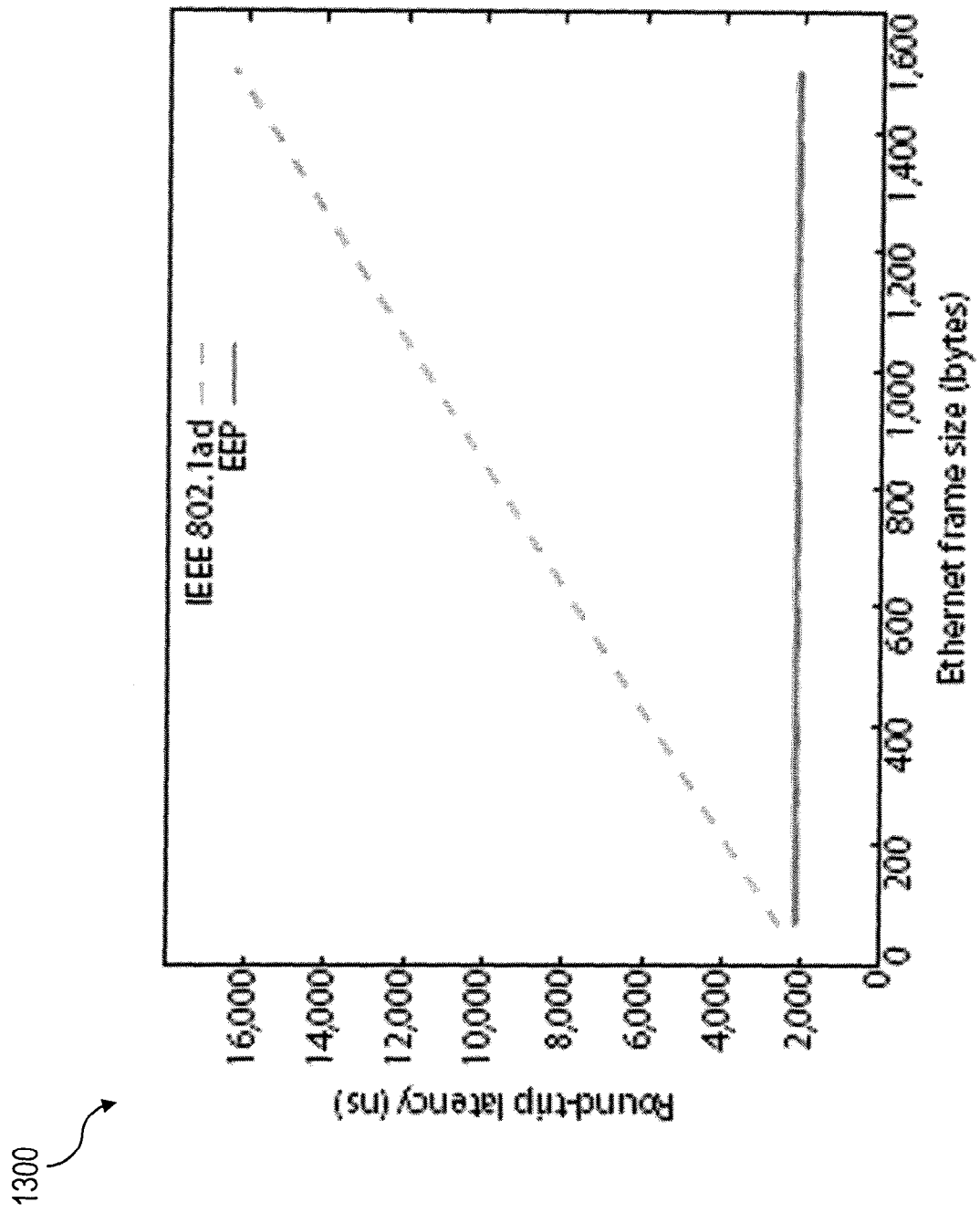
FIG. 13 is a graph showing results of latency measurements of implementations of the current subject matter using EEP and 802.1ad When practical, similar reference numbers denote similar structures, features, or elements.

FIG. 13 is a graph 1300 showing round-trip latency of the IEEE 802.1ad and EEP illustrative examples. Because of store-and-forward, IEEE 802.1ad can add latency proportional to the size of the Ethernet frame. EEP can add a constant amount of latency regardless of frame size. The measurements shown in FIG. 13 were obtained using a NetFPGA configured for packet generation and capture. Both the IEEE 802.1ad and EEP examples work correctly under heavy load without dropping or corrupting frames. The IEEE 802.1ad example interoperates with other Ethernet devices.

A network switching approach such as described herein can replace an entire data center network. For example, the 3,456-port InfiniBand switch available from Sun Microsystems (Santa Clara, Calif.) is constructed as a 3-tier fat-tree of 720 Mellanox InfiniScale III 24-port switch ASICs, which are available from Mellanox Technologies (Sunnyvale, Calif.). In the current subject matter, everything can be packaged into a single chassis. Each of 24 line cards 204 can contain 24 switch ASICs and each of 18 uplink or fabric cards 206 can contain 8 switch ASICs. A midplane circuit board 202 can connect the line cards 204 to the uplink or fabric cards 206 using 432 connectors with 64 pin pairs each.

One advantage of this monolithic design is the elimination of expensive optical transceivers since all chips are close enough to communicate over copper circuit board traces. While the high density can lead to a cable management problem, proprietary splitter cables can be used to aggregate three 10 Gb/s InfiniBand channels over one cable. The pod switch-based design should generalize to much larger networks, for example 65,536 ports using 64-port 10 GbE merchant silicon. In such an example, each of the 64 pod switches can support 1,024 ports.

The subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input.

The subject matter described herein can be implemented in a computing system that includes a back-end component, such as for example a data server, or that includes a middleware component, such as for example an application server, or that includes a front-end component, such as for example a client computer having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. Other implementations may be within the scope of the following claims.

The invention claimed is:

1. An apparatus comprising:
a midplane circuit board comprising an uplink card connector receiver disposed on a first side and a line card connector receiver disposed on a second side that is opposite the first side;
an uplink card comprising a first uplink card connector and a second uplink card connector, the first uplink card connector disposed at least adjacently to a first uplink card edge and the second uplink card connector disposed at least adjacently to a second uplink card edge that is disposed oppositely to the first uplink card edge, the uplink card connecting to the midplane circuit board such that the first uplink card connector interfaces with the uplink card connector receiver with the uplink card disposed orthogonally to the midplane circuit board;
a line card comprising a first line card connector disposed at least adjacently to a first line card edge and a second line card connector disposed at least adjacently to a second line card edge that is disposed oppositely to the first line card edge, the line card connecting to the midplane circuit board such that the first line card connector interfaces with the line card connector receiver with the line card disposed orthogonally to both of the midplane circuit board and the uplink card; and a central processing unit disposed on the midplane circuit board; and at least one memory storing instructions that, when executed by the central processing unit, cause the central processing unit to perform operations comprising:

encapsulating each segment in a sequence of 64 byte segments into a separate Ethernet extension protocol frame, the sequence of 64 byte segments resulting from breaking up a Ethernet frame received from a switch port on the line card or the uplink card;

assigning a same virtual link identification to all Ethernet extension protocol frames originating from the switch port; and passing the Ethernet extension protocol frames from the central processing unit to a destination switch port.

2. The apparatus as in claim 1, wherein the uplink card comprises a plurality of uplink switches configured to connect one or more core switches at a core switching array with the line card.

3. The apparatus as in claim 1, wherein the line card comprises a plurality of line switches configured to connect a plurality of computing nodes with the uplink card.

4. The apparatus as in claim 1, further comprising: one or more substantially planar additional line cards each comprising an additional first line card connector disposed at least adjacently to an additional first line card edge and an additional second line card connector disposed at least adjacently to an additional second line card edge that is disposed oppositely to the additional first line card edge, each of the additional line cards connecting to the midplane circuit board such that the additional first line card connector interfaces with a corresponding additional line card connector receiver on the midplane circuit board, the additional line cards being disposed parallel to the line card and orthogonally to both of the midplane circuit board and the uplink card.

5. The apparatus as in claim 1, further comprising: one or more substantially planar additional uplink cards each comprising an additional uplink line card connector disposed at least adjacently to an additional first uplink card edge and an additional second uplink card connector disposed at least adjacently to an additional second uplink card edge that is disposed oppositely to the additional first uplink card edge, each of the additional uplink cards connecting to the midplane circuit board such that the additional first uplink connector interfaces with a corresponding additional uplink connector receiver on the midplane circuit board, the additional uplink cards being disposed parallel to the uplink card and orthogonally to both of the midplane circuit board and the line card.

6. The apparatus as in claim 5, wherein the uplink card and the one or more additional uplink cards each comprises a plurality of uplink switches configured to connect one or more core switches at a core switching array with the line card and with a plurality of computing nodes connected to the line card.

7. The apparatus as in claim 5, wherein the line card comprises a plurality of line switches configured to connect a plurality of computing nodes connected to the line card with the uplink card and the one or more additional uplink cards and with one or more core switches at a core switching array that are connected to a plurality of uplink switches on each of the uplink card and the one or more additional uplink cards.

8. The apparatus of claim 1, wherein the second uplink card connector is configured to connect to a core switch array for forwarding traffic to and from the core switch array.

9. The apparatus of claim 8, wherein the uplink card also acts as a fabric switch to provide connections between the line card and at least one additional line card connected to an additional line card connector receiver on the second side of the midplane circuit board.

10. The apparatus of claim 1, wherein the uplink card and the line card are substantially planar.

11. The apparatus of claim 1, wherein the uplink card and the line card are planar.

12. The apparatus as in claim 1, further comprising a central processing unit and at least one memory storing instructions that, when executed by the central processing unit, cause the central processing unit to perform operations comprising:

breaking up an Ethernet frame received at the central processing unit from a switch port on the line card or uplink card in a sequence of 64 byte segments.

13. The apparatus as in claim 1, further comprising a central processing unit and at least one memory storing instructions that, when executed by the central processing unit, cause the central processing unit to perform operations comprising:

encapsulating each 64 byte segment of a sequence of 64 byte segments into a separate Ethernet extension protocol frame, the sequence of 64 byte segments resulting from breaking up of an Ethernet frame.

14. The apparatus as in claim 1, further comprising a central processing unit and at least one memory storing instructions that, when executed by the central processing unit, cause the central processing unit to perform operations comprising:

assigning a same virtual link identification to all Ethernet extension protocol frames originating from a switch port on the line card; and passing the Ethernet extension protocol frames from the central processing unit to a destination switch port.

15. A method of creating a switching network comprising one or more pod switches that each comprise uplink cards connected to line cards through a midplane circuit board such that the uplink cards are disposed substantially in parallel to one another and orthogonal to the midplane circuit board and to the line cards, the method comprising:

connecting, via second uplink card connectors disposed adjacent a second uplink card edge of each uplink card, each of a plurality of data connections from each of a plurality of uplink circuits on each uplink card of the pod switch to a different one of a plurality of core switch circuits at a core switch array card of a core switch array, the second uplink card edge being opposite to a first uplink card edge disposed adjacent to the midplane circuit board;

connecting, via second line card connectors disposed adjacent a second line card edge of each uplink card each line card to a plurality of computing nodes such that the line card provides links between each computing node and each of the one or more uplink cards via the midplane circuit board, the second line card edge being opposite to a first line card edge disposed adjacent to the midplane circuit board;

encapsulating each segment in a sequence of 64 byte segments into a separate Ethernet extension protocol frame, the sequence of 64 byte segments resulting from breaking up a Ethernet frame received from a switch port on the line card or the uplink card;

assigning a same virtual link identification to all Ethernet extension protocol frames originating from the switch port; and passing the Ethernet extension protocol frames from a central processing unit on the midplane circuit board to a destination switch port.

16. A high speed switching network system comprising:
a plurality of pod switches that each comprise:
a midplane circuit board comprising an uplink card connector receiver disposed on a first side and a line card connector receiver disposed on a second side that is opposite the first side;
an uplink card comprising a first uplink card connector and a second uplink card connector, the first uplink card connector disposed at least adjacently to a first uplink card edge and the second uplink card connector disposed at least adjacently to a second uplink card edge that is disposed oppositely to the first uplink card edge, the uplink card connecting to the midplane circuit board such that the first uplink card connector interfaces with the uplink card connector receiver with the uplink card disposed orthogonally to the midplane circuit board; and
a line card comprising a first line card connector disposed at least adjacently to a first line card edge and a second line card connector disposed at least adjacently to a second line card edge that is disposed oppositely to the first line card edge, the line card connecting to the midplane circuit board such that the first line card connector interfaces with the line card connector receiver with the line card disposed orthogonally to both of the midplane circuit board and the uplink card;
a central processing unit disposed on the midplane circuit board;
at least one memory storing instructions that, when executed by the central processing unit, cause the central processing unit to perform operations comprising:
encapsulating each segment in a sequence of 64 byte segments into a separate Ethernet extension protocol frame, the sequence of 64 byte segments resulting from breaking up a Ethernet frame received from a switch port on the line card or the uplink card;
assigning a same virtual link identification to all Ethernet extension protocol frames originating from the switch port; and
passing the Ethernet extension protocol frames from the central processing unit to a destination switch port; and
a core switch array that comprises:
one or more core switch array cards that each comprises a core switch central processing unit, a plurality of core switch circuits, and connectors for connecting to the second uplink card connectors of the uplink cards of the plurality of pod switches for forwarding of traffic between the core switch array and the uplink cards, each of the one or more core switch arrays controlling more than one of the uplink cards.

17. The high speed switching network system as in claim 16, wherein the circuits comprise application-specific integrated circuits.

18. The apparatus of claim 16, wherein each uplink card also acts as a fabric switch to provide connections between the line card and at least one additional line card connected to an additional line card connector receiver on the second side of each midplane circuit board.

* * * * *